(12) United States Patent
Hatano

(10) Patent No.: US 9,386,287 B2
(45) Date of Patent: Jul. 5, 2016

(54) IMAGE PROCESSOR WHICH REARRANGES COLOR INFORMATION, IMAGE PROCESSING METHOD, AND DIGITAL CAMERA

(71) Applicant: PANASONIC CORPORATION, Osaka (JP)

(72) Inventor: Toshinobu Hatano, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 14/089,736

(22) Filed: Nov. 25, 2013

(65) Prior Publication Data

US 2014/0078338 A1 Mar. 20, 2014

Related U.S. Application Data

(63) Continuation of application No. PCT/JP2012/003473, filed on May 28, 2012.

(30) Foreign Application Priority Data

Jun. 8, 2011 (JP) .................................. 2011-128122

(51) Int. Cl.
*H04N 5/235* (2006.01)
*H04N 9/64* (2006.01)
(Continued)

(52) U.S. Cl.
CPC ................ *H04N 9/64* (2013.01); *G06T 3/4015* (2013.01); *G09G 5/026* (2013.01); *H04N 9/045* (2013.01);
(Continued)

(58) Field of Classification Search
CPC ........................................................ H04N 9/64
See application file for complete search history.

(56) References Cited

U.S. PATENT DOCUMENTS 6,819,359 B1 11/2004 Oda
6,867,803 B1 3/2005 Funamoto
(Continued)

FOREIGN PATENT DOCUMENTS

EP 1 530 376 A1 5/2005
JP 2001-245141 A 9/2001
(Continued)

OTHER PUBLICATIONS

International Search Report issued in International Application No. PCT/JP2012/003473 with Date of mailing Aug. 21, 2012 with English Translation.
(Continued)

*Primary Examiner* — Gary C Vieaux
(74) *Attorney, Agent, or Firm* — McDermott Will & Emery LLP

(57) ABSTRACT

An image processor includes: a reduction (resizing) processor 102 that reduces an original image obtained from a single-sensor color imaging device to an image conforming to a display size of a display monitor; and a rearranged color array display data generation processor 103 that generates one or more types of color array images conforming to a color pixel array of the display monitor, based on the reduced image. With this configuration, one or more types of display reduced-size image having color information of the original image are generated. Thus, a small-size image for display generated from a large-size original image output from an imaging device can be displayed at high speed with a minimum frame delay.

29 Claims, 11 Drawing Sheets

(51) Int. Cl.
*H04N 9/04* (2006.01)
*G09G 5/02* (2006.01)
*G06T 3/40* (2006.01)

(52) U.S. Cl.
CPC .... *G09G 2320/0242* (2013.01); *G09G 2340/02* (2013.01); *G09G 2340/045* (2013.01); *G09G 2340/0428* (2013.01)

(56) References Cited

U.S. PATENT DOCUMENTS

| | | | |
|---|---|---|---|
| 2002/0044778 | A1 | 4/2002 | Suzuki |
| 2003/0231247 | A1 | 12/2003 | Watanabe |
| 2006/0132628 | A1 | 6/2006 | Suzuki |
| 2006/0274170 | A1 | 12/2006 | Azuma |
| 2007/0127095 | A1 | 6/2007 | Sugimori |
| 2008/0043133 | A1 | 2/2008 | Sasaki et al. |
| 2008/0106631 | A1 | 5/2008 | Sugawara et al. |
| 2008/0112648 | A1 | 5/2008 | Hatano |
| 2008/0129845 | A1 | 6/2008 | Azuma |
| 2008/0129846 | A1 | 6/2008 | Azuma |
| 2008/0136943 | A1 | 6/2008 | Azuma |
| 2009/0237525 | A1 | 9/2009 | Mizuno et al. |
| 2009/0244333 | A1 | 10/2009 | Lukac |
| 2010/0194917 | A1 | 8/2010 | Funamoto |
| 2011/0058064 | A1* | 3/2011 | Hatano ............... H04N 1/393 348/223.1 |
| 2011/0216230 | A1 | 9/2011 | Suzuki |
| 2013/0194449 | A1 | 8/2013 | Suzuki |
| 2014/0085498 | A1* | 3/2014 | Hatano ................. H04N 9/07 348/221.1 |

FOREIGN PATENT DOCUMENTS

| | | |
|---|---|---|
| JP | 2002-084547 A | 3/2002 |
| JP | 2003-346143 A | 12/2003 |
| JP | 2004-241813 A | 8/2004 |
| JP | 2004-356974 A | 12/2004 |
| JP | 2005-115598 A | 4/2005 |
| JP | 2006-060449 A | 3/2006 |
| JP | 2006-180108 A | 7/2006 |
| JP | 2007-096677 A | 4/2007 |
| JP | 2007-158509 A | 6/2007 |
| JP | 2008-028956 A | 2/2008 |
| JP | 2008-048307 A | 2/2008 |
| JP | 2008-123086 A | 5/2008 |
| JP | 2009-017123 A | 1/2009 |
| JP | 2009-188914 A | 8/2009 |
| JP | 2010-020100 A | 1/2010 |
| JP | 2010-068331 A | 3/2010 |
| JP | 2010-183173 A | 8/2010 |
| JP | 4596986 B2 | 12/2010 |
| WO | 2010/016166 A1 | 2/2010 |

OTHER PUBLICATIONS

Search Report issued in Chinese Search Report issued in Chinese Application No. 201280026584.9 dated Apr. 13, 2015.

Chinese Office Action dated Oct. 23, 2015 issued in Chinese Patent Application No. 201280026584.9.

* cited by examiner

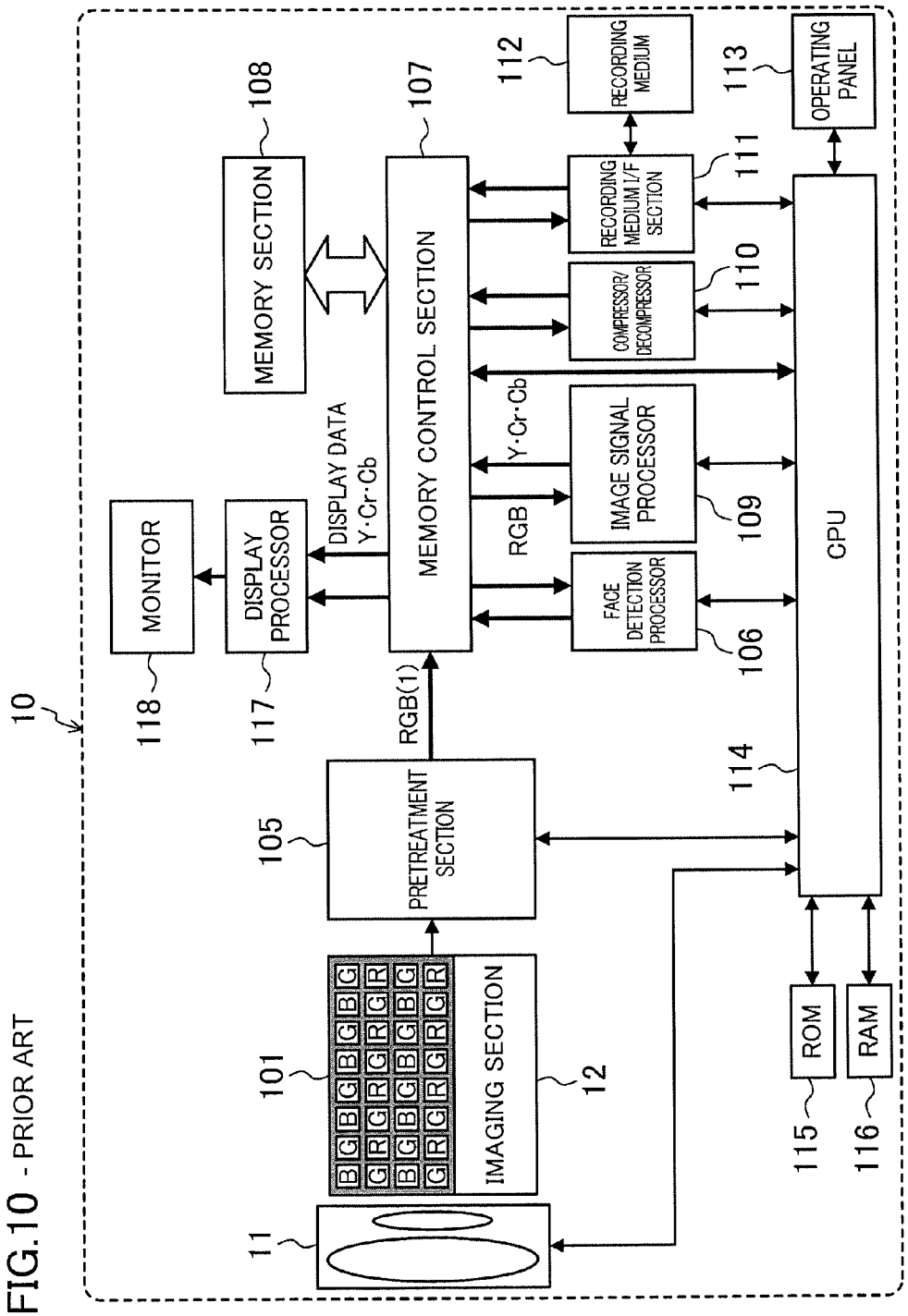
FIG.10 - PRIOR ART

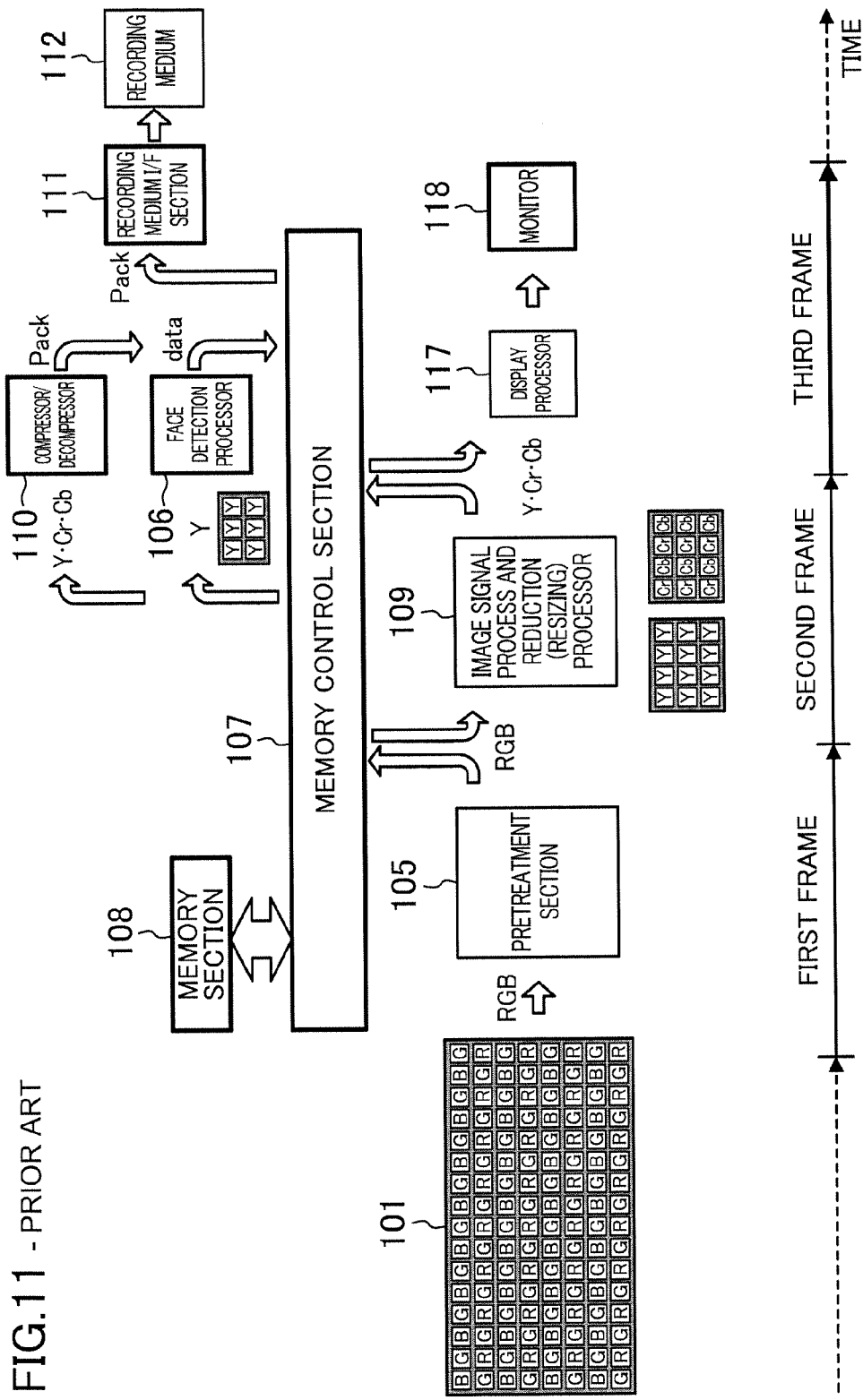
FIG.11 - PRIOR ART

IMAGE PROCESSOR WHICH REARRANGES COLOR INFORMATION, IMAGE PROCESSING METHOD, AND DIGITAL CAMERA

CROSS-REFERENCE TO RELATED APPLICATIONS

This is a continuation of International Application No. PCT/JP2012/003473 filed on May 28, 2012, which claims priority to Japanese Patent Application No. 2011-128122 filed on Jun. 8, 2011. The entire disclosures of these applications are incorporated by reference herein.

BACKGROUND

The present disclosure relates to image processors, image processing methods, and digital cameras suitable for performing high-speed operation with low power consumption in displaying images obtained by reducing the sizes of original images from single-sensor color imaging devices.

In the field of recent single-lens reflex digital cameras equipped with large-size imaging devices, mirror-less single-lens reflex digital cameras requiring neither optical viewfinders nor movable mirrors have attracted attention. A mirror-less single-lens reflex digital camera enables the user to determine a composition of a picture while checking an image of a subject on a liquid crystal display (LCD) monitor, and to take still or video images. This feature is typically employed in widely used digital cameras and cameras installed in cellular phones.

As described above, a typical digital camera is equipped with a dedicated LCD monitor and can be used when the user determines a composition of a picture while checking an image of a subject on an LCD monitor. At the same time, the camera automatically adjusts exposure and focus in a specified area through face recognition and motion recognition so as to capture still or video images.

An imaging system typified by such a digital camera includes a color separation filter on an imaging device in order to capture color images. A color separation filter known as a Bayer filter, for example, includes primary color filters, i.e., red (R), green (G), and blue (B) color filters, arranged in a square grid, corresponding to pixels of the imaging device. Specifically, in the Bayer pattern, filters of the same color component are placed at every other pixel position along both the sensor-reading and vertical directions of the pixel array. Image data obtained through the color separation filter and serving as an output of the imaging device needs to be handled in a manner that maintains the Bayer pattern in pre-input processing in order to reproduce the colors of the subject.

A small-size image to be displayed is generated from a large-size original image output from an imaging device and is displayed in the following manner. First, the synchronization process of obtaining information on R, G, and B for each pixel is performed with dynamic-range adjustment being performed or white balance being obtained based on an original image. Thereafter, the resulting data is subjected to color image processing to be converted into YCrCb data, which is typically handled. The RCrCb data is then subjected to a reduction (resizing) process to conform to a display size on an LCD monitor. Finally, the resulting data is subjected to a display process to be adjusted in accordance with monitor characteristics. In this manner, the resulting data is displayed on a dedicated monitor.

FIG. 10 is a conceptual view illustrating an internal signal processing block of a typical digital camera.

In FIG. 10, an optical image of a subject that has passed through an optical lens 11 is formed on an imaging device plane, and is output from an imaging device. RAW image data 101 having a Bayer pattern, which is an original image (one surface) of a single-sensor imaging device, is subjected to processes such as DC level adjustment and gain adjustment in a pretreatment section 105, is temporarily written in a memory section 108 via a memory control section 107, is read out from the memory section 108 via the memory control section 107 in a next process, and then is input to an image signal process and reduction (resizing) processor 109. The image signal processor 109 performs an image signal process of converting a RAW image having a Bayer pattern into a YCrCb data image.

The image signal processor 109 converts the RAW image into the YCrCb data image, and in order to reduce the image to an image size for display, performs a reduction (resizing) process to generate an image of a desired display size. The generated YCrCb data image of a display size is written in the memory section 108 again via the memory control section 107.

At the same time, after the conversion into the YCrCb data image, in order to reduce the image to a size for face detection, the image signal process and reduction (resizing) processor 109 performs a reduction (resizing) process on a luminance signal Y to generate a desired luminance image data for face detection. The luminance image data for face detection from the luminance signal Y is written in the memory section 108 via the memory control section 107, and is suitably read out again from the memory section 108 via the memory control section 107 by a face detection processor 106, and face information such as the position and size of a face in the image is extracted. The extracted information is written in the memory section 108 via the memory control section 107. The face detection information written in the memory section 108 is read out by a CPU 114 via the memory control section 107, is converted into display information indicating a face position. In this manner, display data is generated and written in the memory section 108. At the same time, the CPU 114 automatically adjusts exposure and focus for a specific area based on face recognition information.

The YCrCb data image of a display size written in the memory section 108 is read out from the memory section 108 via the memory control section 107 again, and is input to a display processor 117. At this time, the display information indicating the face position is also read out from the memory section 108, and is input to the display processor 117.

The YCrCb data image and the display information indicating the face position that have been input to the display processor 117 are converted to conform to monitor characteristics of a monitor 118 in the display processor 117, and are output to the monitor 118 to be displayed thereon.

Similarly, in the case of recoding a video image of a standardized size, the original image 101 is converted into a YCrCb data image in the image signal process and reduction (resizing) processor 109, and then is subjected to a reduction (resizing) process in the image signal process and reduction (resizing) processor 109, thereby generating an image of a desired video recording size.

The generated YCrCb data image is written in the memory section 108 again via the memory control section 107. The YCrCb data image of a video recording size written in the memory section 108 is read out from the memory section 108 via the memory control section 107 again, and is input to a compressor/decompressor 110. The YCrCb data image input to the compressor/decompressor 110 is subjected to data compression using a video image codec method such as MJPEG, MPEG, or H264, and is written in the memory section 108 via the memory control section 107 again. The compressed video data is read out from the memory section 108 via the memory control section 107 again, and is written on a recording medium 112 through a recording medium interface 111.

FIG. 11 illustrates a flow of an internal signal processing of a typical digital camera in detail.

In FIG. 11, a period in which RAW image data 101 having a Bayer pattern of an arbitrary two-dimensional size is input is defined as a first frame period, and the input RAW image data 101 is processed by the pretreatment section 105 in this first frame period. In the next second frame period, a process in an image signal process and reduction (resizing) processor 109 is performed, following a third frame period in which processing in a display processor 117 is performed and the resulting image is displayed on the monitor 118. After the third frame period, processes are carried out in the face detection processor 106 and the compressor/decompressor 110, thereby recording compressed data on the recording medium 112 through the recording medium interface 111.

Regarding the order of processes in the first through third frame periods, the input RAW image 101 is displayed on the monitor 118 and is relatively delayed by two frame periods at the minimum.

In existing techniques of reducing (resizing) a RAW image of RGB data with a pretreatment as presented in, for example, Japanese Unexamined Patent Publications Nos. 2003-346143, 2001-245141, and 2002-84547, color separation into individual pieces of R, G, B data is performed or pixels of the same color are mixed in an initial process for decimation in reducing (resizing) RAW data of RGB as an original image. The techniques of Japanese Unexamined Patent Publications Nos. 2003-346143, 2001-245141, and 2002-84547 perform the following signal processing. Specifically, to determine a composition of a picture while checking an image of a subject on an LCD monitor in shooting with a digital camera, a single type of RAW data with an RGB Bayer pattern reduced in the manner described above is temporarily taken in a memory, and then is subjected to a color development image process of converting the data into YCrCb data and a display process of converting the data to conform to characteristics of the LCD monitor to display the resulting image on a dedicated monitor. Concurrently, YCrCb data is compressed and recorded.

SUMMARY

The conventional signal process illustrated in FIGS. 9 and 10 has some problems. Specifically, the process of reducing an image to a plurality of sizes performed after the signal process of converting a single type of a RAW image into a YCrCb data image has the following two problems:

(1) In a monitor mode in which a composition of a picture is determined with an image of a subject being checked and a video image recording mode, a large-size RAW image data is subjected to an image signal process and converted into YCrCb data with its large size maintained, and then is subjected to an image reduction process. The conversion into YCrCb data involves a redundant process, which causes a frame delay in a monitor mode display and might miss a real-time display conforming to a motion of the subject and a good opportunity to take a photograph.

(2) A reduction (resizing) process is a process for reducing the number of recording images. A reduction (resizing) process performed before image processing, if possible, can reduce the amount of memory access at subsequent processes. However, in the case of performing reduction (resizing) after conversion into a YCrCb data image, as in a conventional technique, the conversion process of converting data that is discarded by decimation into a YCrCb data type is a redundant process. This conversion into the YCrCb data type is performed via a memory buffer, and thus, involves power consumption of an I/O buffer in proportion to the processed amount relative to an image size. Thus, this case is ineffective in terms of power consumption reduction.

Similarly, under the circumstances where the number of pixels in an imaging device is increasing and the high-speed read technique conforming to video recording is advancing, the techniques of Japanese Unexamined Patent Publications Nos. 2003-346143, 2001-245141, and 2002-84547 reduce a RAW image before processing. In shooting an image with a digital camera, in a monitor mode in which a composition of a picture is determined with an image of a subject being checked on an LCD monitor and, at the same time, read-time autofocus (AF) and/or autoexposure (AE), for example, is performed with various recognition operations such as face recognition being performed, conversion into a YCrCb data type via a memory buffer is performed. This conversion is a main factor in causing a frame delay in, for example, monitor display and image recognition.

It is therefore an object of the present to provide an image processor that generates a small-size RAW image for display from a large-size RAW original image output from an imaging device and displays the small-size RAW image on a monitor in a frame period in which the original image is input.

To achieve the object, according to the present disclosure, a small-size RAW image to be used as a monitor display image is generated from a RAW original image without performing a color development image process of converging an original image into a YCrCb data type. Thus, an image processor and an image processing method according to the present disclosure can perform display an image display monitor at high speed without a frame delay.

Specifically, an image processor of a first aspect of the present disclosure is an image processor image processor capable of generating a reduced-size image from a digital image signal of an original image having pixels of a plurality of colors arranged in a color array with a periodicity, and of displaying the reduced-size image. This image processor includes: a reduction resizing processor configured to reduce an original image from a single-sensor color imaging device and obtain a reduced-size image of a size conforming to a display size of a display monitor; and a rearranged color array data generation processor configured to generate, based on the reduced-size image obtained by the reduction resizing processor, one or more types of display reduced-size images that are to be displayed from two-dimensionally arranged multicolor array data obtained by rearranging color information of the original image relative to a reference pixel position.

According to a second aspect of the present disclosure, the image processor of the second aspect further includes a rearranged color array display data generation processor configured to generate one or more types of color array display data conforming to a color pixel array for the display monitor, based on the display reduced-size image generated by the rearranged color array data generation processor.

According to a third aspect of the present disclosure, the image processor of the first aspect further includes: a data path through which the display reduced-size image is input from the rearranged color array data generation processor directly to a display processor that performs a display process in accordance with display characteristics of the display monitor; and a data path through which the display reduced-size image is input from the rearranged color array data generation processor directly to the display processor via a memory section, wherein a memory control section configured to control the memory section selectively performs an image input data path control to input the display reduced-size image from the rearranged color array data generation processor either directly to the display processor or to the display processor via the memory section, depending on an operation mode in shooting.

According to a fourth aspect of the present disclosure, in the image processor of the first aspect, each of a reduction resizing process in the reduction resizing processor and a rearranged color array data generation process in the rearranged color array data generation processor is allowed to be performed as each of a horizontal process and a vertical process on the original image.

According to a fifth aspect of the present disclosure, in the image processor of the first aspect, in the reduction resizing processor and the rearranged color array data generation processor, a first reduction resizing process is performed on the original image in a sensor-reading direction on a line-by-line basis so that the original image is reduced and resized only in one direction, a second reduction resizing process in a vertical direction orthogonal to the sensor-reading direction and a rearranged color array data generation process are performed on one type of multicolor array data that has been reduced and resized only in the one direction, thereby generating two types of multicolor array data that has been two-dimensionally reduced and resized, and a rearranged color array data generation process is performed on the two types of the multicolor array data on a line-by-line basis again, thereby generating a plurality of types of multicolor array data.

According to a sixth aspect of the present disclosure, in the image processor of the fifth aspect, in the reduction resizing processor and the rearranged color array data generation processor, one type of multicolor array data obtained by reducing and resizing the original image only in a horizontal direction in the first reduction resizing process is written in a memory device, the one type of the multicolor array data is read out from the memory device on a line-by-line basis in a direction orthogonal to a line direction in write operation, and is subjected to a reduction resizing process and a rearranged color array data generation process again, thereby generating two types of two-dimensionally reduced and resized color array data, and the two types of the multicolor array data are subjected to rearranged color array data generation process on a line-by-line basis again, thereby generating a plurality of types of multicolor array data.

According to a seventh aspect of the present disclosure, in the image processor of the sixth aspect, in the reduction resizing processor and the rearranged color array data generation processor, while one type of multicolor array data obtained by reducing and resizing the original image only in one direction in the first reduction resizing process is being written on a line-by-line basis in a line memory including a plurality of lines, data corresponding to a plurality of lines is read out, then luminance data and color carrier data are extracted from a plurality of pieces of vertical data of interest located at an identical position in the sensor-reading direction in the read-out data corresponding to a plurality of lines and are subjected to a reduction resizing process and a rearranged color array data generation process again, and in the reduction resizing process in the vertical direction, the number of output lines relative to the number of input lines is reduced, thereby generating two types of multicolor array data that has been two-dimensionally reduced and resized, and the two types of the multicolor array data are subjected to a rearranged color array data generation process on a line-by-line basis again, thereby generating a plurality of types of color array data.

According to an eighth aspect of the present disclosure, in the image processor of the first aspect, in the reduction resizing processor and the rearranged color array data generation processor, the original image is subjected to a rearranged color array data generation process and a reduction resizing process performed in a sensor-reading direction on a line-by-line basis such that the original image is reduced and resized only in one direction, and a reduction resizing process in a direction orthogonal to the sensor-reading direction and a rearranged color array data generation process are performed on two types of color array data that have been reduced and resized only in the one direction, thereby generating a plurality of types of color array data that have been two-dimensionally reduced and resized.

According to a ninth aspect of the present disclosure, in the image processor of the eighth aspect, in the reduction resizing processor and the rearranged color array data generation processor, two types of multicolor array data obtained by performing, on the original image, a rearranged color array data generation process and a reduction resizing process performed in the sensor-reading direction on a line-by-line basis such that the original image is reduced and resized only in a horizontal direction, are written in a memory device, and the two types of color array data are read out from the memory device on a line-by-line basis in a direction orthogonal to a line direction in writing, and are subjected to a reduction resizing process and a rearranged color array data generation process again, thereby generating a plurality of types of color array data that have been two-dimensionally reduced and resized.

According to a tenth aspect of the present disclosure, in the image processor of the ninth aspect, in the reduction resizing processor and the rearranged color array data generation processor, while two types of color array data obtained by performing, on the original image, the rearranged color array data generation process and the reduction resizing process performed in the sensor-reading direction on a line-by-line basis such that the original image is reduced and resized only in the horizontal direction is being written on a line-by-line basis in a line memory including a plurality of lines, data corresponding to a plurality of lines is read out, then a reduction resizing process and a rearranged color array data generation process are performed again on a plurality of pieces of vertical data of interest located at an identical position in the sensor-reading direction in the read-out data corresponding to a plurality of lines, and in the reduction resizing process in the vertical direction, the number of output lines relative to the number of input lines is reduced, thereby generating a plurality of types of color array data that have been two-dimensionally reduced and resized.

According to an eleventh aspect of the present disclosure, in the image processor of the fifth aspect, the reduction resizing processor and the rearranged color array data generation processor include: for a horizontal reduction resizing process and a rearranged color array data generation process, a filter processor configured to extract luminance data and color carrier data from the original image through a process on a line-by-line basis in the sensor-reading direction; a color carrier inversion demodulation processor configured to convert the color carrier data into color difference data; a reduction resizing processor configured to reduce and resize the luminance data and the color difference data independently of each other; a color carrier modulation processor configured to generate first color carrier data having a different sign for each pixel of the color difference data that has been reduced and resized by the reduction resizing processor and also generate second color carrier data having a different sign from that of the first color carrier data; and a rearranged color array data generation processor configured to recombine the luminance data that has been reduced and resized and the first color carrier data to generate an image having color array data of the original image and also recombine the luminance data that has been reduced and resized and the second color carrier data to generate an image having color array data different from that of the original image.

According to a twelfth aspect of the present disclosure, in the image processor of the fifth aspect, the reduction resizing processor and the rearranged color array data generation processor include: for a vertical reduction resizing process and a rearranged color array data generation process, a filter processor configured to read data corresponding to a plurality of lines while writing color array data obtained by performing a rearranged color array data generation process and a reduction resizing process performed in the sensor-reading direction on a line-by-line basis only such that the original image is reduced and resized only in the horizontal direction on a line-by-line basis in a line memory including a plurality of lines, and to extract luminance data and color carrier data on a line-by-line basis in the vertical direction from a plurality of pieces of vertical data of interest located at an identical position in the sensor-reading direction in the read-out data corresponding to a plurality of lines; a vertical color carrier inversion demodulation processor configured to convert the extracted vertical color carrier data into vertical color difference data; a vertical reduction resizing processor configured to reduce the number of output lines relative to the number of input lines in the vertical luminance data and the vertical color difference data independently of each other for reduction and resizing of data; a vertical color difference data inversion modulation processor configured to generate first color carrier data having a different sign for each line and second color carrier data having a different sign from that of the first color carrier data, from vertically continuous pieces of color difference data that have been reduced and resized in the vertical direction; and a rearranged color array data generation processor configured to recombine the luminance data that has been reduced and resized and the first color carrier data to generate an image having color array data of the original image and also recombine the luminance data that has been reduced and resized and the second color carrier data to generate an image having color array data different from that of the original image.

According to a thirteenth aspect of the present disclosure, in the image processor of the first aspect, the original image is an image obtained by using a single-sensor color imaging device and has a plurality of pixels of colors arranged in a color array with a periodicity through a primary color filter.

As described above, according to the present disclosure, when a small-size image to be displayed is directly generated from a large-size original image output from an imaging device and is displayed on a monitor, the original image is reduced (resized) to an image of a small size for display without a color development image process of converting the original image into a YCrCb data image. In addition, based on the resized image, a display reduced-size image having color information of the original image can be generated. Thus, the load in the processes requiring memory access can be reduced, and images can be displayed on a display monitor with a minimum frame delay. As a result, high-speed monitor-mode operation for subject recognition can be achieved.

As described above, according to the present disclosure, when a small-size image to be displayed is directly generated from a large-size original image output from an imaging device and is displayed on a monitor in a monitor mode in which a composition of a picture is determined while checking an image of a subject, the original image is reduced to a RAW image of a small size for display without a color development image process of converting the original image into a YCrCb data image. Thus, the load in the processes requiring memory access can be reduced, and images can be displayed on a display monitor with a minimum frame delay. As a result, high-speed monitor-mode operation for subject recognition can be achieved.

BRIEF DESCRIPTION OF THE DRAWINGS

FIG. 10 is a block diagram of internal signal processors of a conventional digital camera.

FIG. 11 illustrates a flow of internal signal processes of the conventional digital camera.

DETAILED DESCRIPTION

Preferred embodiments of an image processor and an image processing method according to the present disclosure will be described with reference to the drawings.

Figure 1:
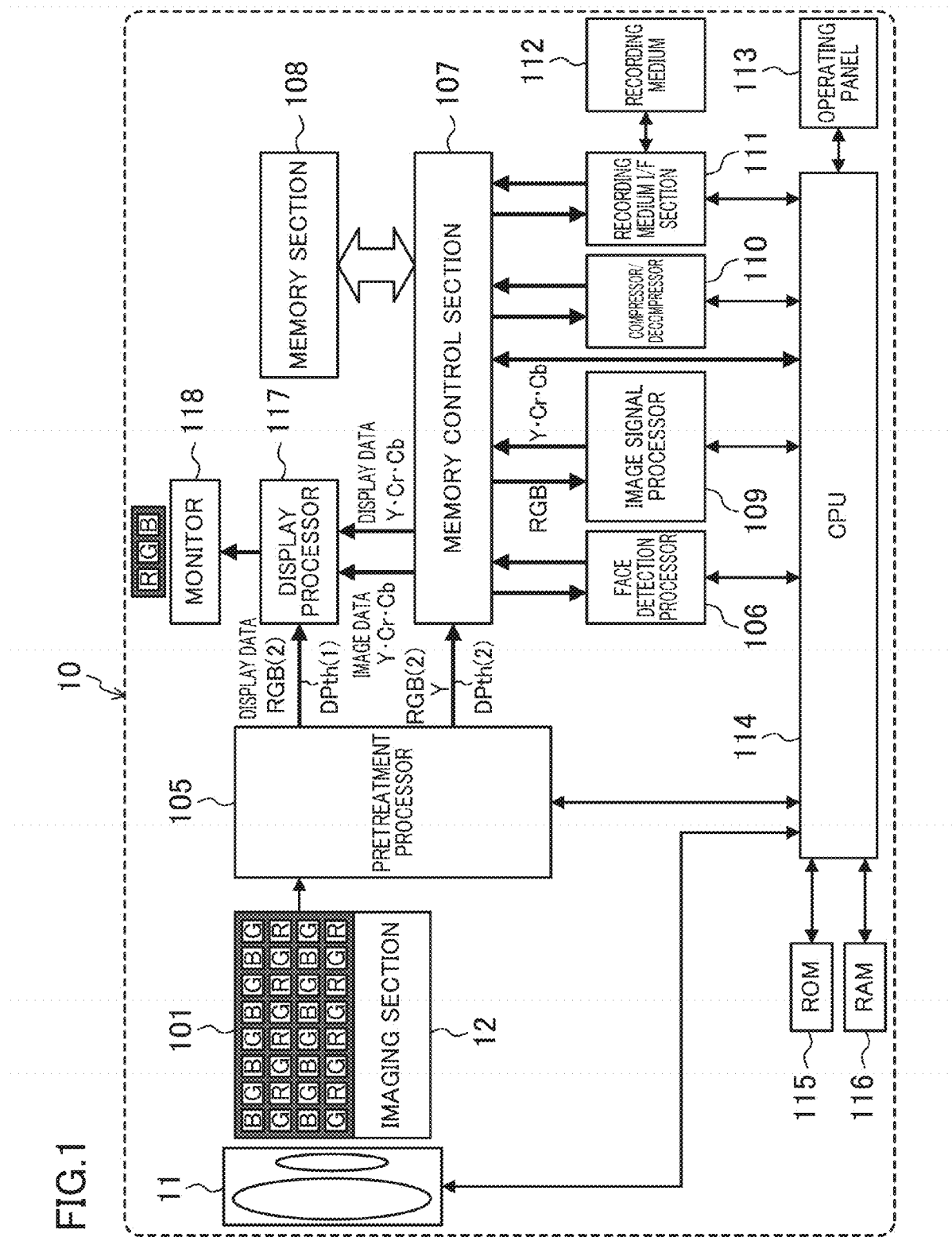
FIG. 1 illustrates an overall configuration of an imaging system including an image processor according to an embodiment of the present disclosure.

FIG. 1 illustrates a configuration of an imaging system including an image processor according to an embodiment of the present disclosure.

Similarly to the configuration of FIG. 10 described in the section of BACKGROUND, an imaging system 10 illustrated in FIG. 1 is a single-sensor digital camera that converts an optical image of a subject captured through an imaging section 12 into digital image data and records the digital image data on a recording medium 112.

Operation of fundamental components of the configuration of FIG. 1 are similar to those described with reference to FIG. 10. The configuration of FIG. 1 differs from that of FIG. 10 basically in two aspects:

(1) an image processing function performed in a pretreatment section 105; and (2) the function of transferring data from the pretreatment section 105 directly to the display processor 117.

First, fundamental components of the configuration of FIG. 1 will be described.

The imaging section 12 includes imaging devices (not shown) typified by, for example, CCD devices or CMOS devices. The imaging devices have light-receiving surfaces on each of which a large number of photodiodes (photosensitive pixels) are two-dimensionally arranged and perform photoelectric conversion on subject information that has passed through an optical lens (not shown). Each of the imaging devices has a color filter (not shown) having a predetermined color array in which one of red (R), green (G), or blue (B) is located at a position corresponding to each pixel, and selects colors of light incident on photodiodes serving as photoreceivers. This embodiment employs a Bayer pattern as an example.

The image data from the imaging section 12 is called a RAW image, which is a digital signal obtained by an A/D conversion process. The RAW image data 101 having a Bayer pattern is obtained with a structure in which photoreceivers are arranged in a square matrix, occurring at a predetermined pitch along both of the row and column directions (i.e., the color filters occur at every square position along both of the row and column directions of a square grid). Note that, in an actual imaging surface of the imaging device, the structure of the pixel array of the RAW image data 101 having the Bayer pattern is periodically repeated along both of the sensor-reading and vertical directions. Of course, the color filter array structure of the present disclosure is not limited to the Bayer pattern, and a variety of array structures, such as a G-stripe, may be employed. In this embodiment, the primary color filter is used. Alternatively, a complementary color filter including yellow (Y), magenta (M), cyan (C), and green (G) color filters may be employed. Moreover, a primary color filter and a complementary color filter may be combined in any manner, or a white (W) color filter may be employed.

The RAW image data 101 obtained by A/D conversion is recorded on the recording medium 112 based on an operation mode of the imaging system 10 through necessary signal processing or without signal processing.

In a shooting mode, an image of a subject is displayed on a monitor 118. The imaging system 10 of this embodiment is capable of recording a still image in a JPEG format in a shooting mode and recording a compressed video image in, for example, an MPEG format. In addition, the imaging system 10 is capable of recording the RAW image data 101 immediately after A/D conversion without change.

A case where a still image is recorded in a JPEG format in a monitor mode in which a composition of a picture is determined with an image of a subject being checked, will be described.

First, RAW image data 101 obtained by A/D conversion and having a Bayer pattern is reduced (resized) to a monitor size in the pretreatment section 105, and is converted to have a color pixel array of the monitor 118 to be output as display data RGB(2) in real time directly from a data path DPth(1) to the display processor 117. Image quality adjustment to monitor characteristics is performed by the pretreatment section 105 or the display processor 117. In this monitor mode without a frame delay, various recognition operations are performed at a time.

In reducing (resizing) the RAW image data 101 having the Bayer pattern to a display size, the pretreatment section 105 generates data Y for face detection including only a luminance component, and the data Y is written in the memory section 108 via a memory control section 107.

The face detection processor 106 suitably reads data Y of a detection size from the memory section 108 via the memory control section 107. In performing a face detection process on data Y of a size smaller than the display size, the image signal process and reduction (resizing) processor 109 performs a reduction (resizing) process to write data Y of the detection size in the memory section 108 again and then suitably reads out the data Y. The face detection processor 106 detects face information such as the position and size of a face in an image from the read-out data Y, and writes the detection result information in the memory section 108 via the memory control section 107.

A CPU 114 reads the face detection information written in the memory section 108 via the memory control section 107, generates data of a display size from the detection information indicating the face position through conversion, and writes the generated data in the memory section 108 as display data. In addition, the face detection information is processed by the CPU 114 together with information obtained from an automatic calculator (not shown) that performs operation necessary for the autoexposure (AE) control and the autofocus (AF) control described above. Based on a result of focus evaluated value calculation with respect to an arbitrary position of a human subject, a lens driving motor (not shown) is controlled to move an optical lens 11 to a focus position, and a diaphragm and an electronic shutter are controlled for exposure control. The display data indicating the face position information is read out from the memory section 108 via the memory control section 107, and is input to the display processor 117. The display data indicating the face position information and input to the display processor 117 is converted into an input data type conforming to characteristics of the monitor 118 in the display processor 117. The resulting data is superimposed on the display data RGB(2), and is displayed on the monitor 118.

Next, a case where transition to still image recording operation in a JPEG format from the monitor mode will be described.

Upon transition to the still image recording mode, a RAW original image 101 having all the pixels of the imaging device is output from the imaging section 12. The RAW original image 101 is pretreated in the pretreatment section 105, and is written in the memory section 108 via the memory control section 107. Then, the RAW original image 101 is sent to the image signal process and reduction (resizing) processor 109 via the memory control section 107.

The image signal processor 109 performs various processes, such as a synchronization process (of calculating the color of each point by interpolation for a spatial gap between chrominance signals in the color filter array), while balance (WB) adjustment, gamma correction, generation of a luminance signal and a color-difference signal, contour enhancement, scaling (enlargement/reduction) by an electronic zooming function, and conversion (resizing) of the number of pixels, on an image signal in accordance with a command from the CPU 114. Some of these processes such as while balance (WB) adjustment and gamma correction may be performed in the pretreatment section 105. The pretreatment section 105 and the image signal process and reduction (resizing) processor 109 perform the processes on an image signal by using the memory section 108 capable of temporarily recording an image that is being processed via a memory controller 107.

In the pretreatment section 105 and the image signal process and reduction (resizing) processor 109, image data subjected to predetermined signal processing is sent to the compressor/decompressor 110 and compressed in accordance with a JPEG compression format.

The compressed image data is recorded on the recording medium 112 via a recording medium interface (I/F) section 111. The recording medium 112 is not limited to semiconductor memories, such as a memory card. Various other media, such as a magnetic disk, an optical disk, and an opto-magnetic disk, may be employed. The recording medium 112 is not limited to removable media, either, and may be incorporated in the imaging device 10 (e.g., may be an internal memory).

The CPU 114 is a control section that performs a centralized control of the imaging device 10 in accordance with a predetermined program. The CPU 114 controls operation of each circuit in the imaging device 10 based on a command signal from an operating panel 113. A ROM 115 stores a program to be executed by the CPU 114 and various types of data required for control, for example. A RAM 116 is used as a working area for the CPU 114.

The operating panel 113 is used by the user to input various commands to the imaging system 10. For example, the operating panel 113 includes various operating means, such as a mode select switch for selecting the operation modes of the imaging system 10, a cross key for inputting a command to select a menu item (move a cursor), a command to move a reproduced image forward or backward by a frame-by-frame basis, etc., an execution key for inputting a command to confirm (register) a selected item or a command to execute an operation, a cancel key for erasing a desired target, such as a selected item, or cancelling a command, a power switch, a zoom switch, and a shutter-release switch. Each of the switches is also implemented as an area switch on a touch panel.

The CPU 114 controls the imaging section 12 based on various shooting settings (e.g., exposure settings, the presence or absence of strobe flash, and a shooting mode) in accordance with a command signal input from the operating panel 113. The CPU 114 also performs automatic exposure (AE) control, automatic focus adjustment (AF) control, automatic white balance (AWB) control, lens drive control, image processing control, and control of reading or writing of the recording medium 112, for example.

For example, in transition of still image capturing from a monitor mode without a frame delay, the CPU 114 performs the automatic focus adjustment (AF) control when detecting that the shutter-release switch is pressed halfway down, and starts the exposure control and the read control to capture an image to be recorded when detecting that the shutter-release switch is pressed all the way down. The CPU 114 also optionally sends a command to a strobe control circuit (not shown) to control light emission of a flashtube (a light emission section), such as a xenon flashtube.

The pretreatment section 105 has an image processing function, which is a feature of the present disclosure and will be described in detail later, and includes an automatic calculator (not shown) that performs calculation required for the AE control and AF control. In the case of capturing a still image, the pretreatment section 105 performs focus evaluated value calculation and AE calculation, for example, based on an image signal captured in response to a halfway-push of the shutter-release switch, and sends a result of the calculation to the CPU 114. When detecting that the shutter-release switch is pressed all the way down, the CPU 114 controls a lens drive motor (not shown) based on the result of the focus evaluated value calculation to move the optical lens 11 to a focus position, and also controls a diaphragm and an electrical shutter to adjust exposure. The RAW Image data thus captured is subjected to predetermined image processing and is recorded on the recording medium 112 in accordance with a recording mode.

In the case of capturing a video image, the above-described series of image processing is continuously performed while the video image is recorded. Note that the compression format may be MPEG using a JPEG format or any other formats. A compression process corresponding to the compression format to be used and continuously operating on a frame-by-frame basis may be employed.

(Image Processing in Pretreatment Section)

Now, the image processing function that is a feature of the present disclosure and is performed in the pretreatment section 105 in the imaging system 10 having the above-described configuration as illustrated in FIG. 1 will be described.

Figure 2:
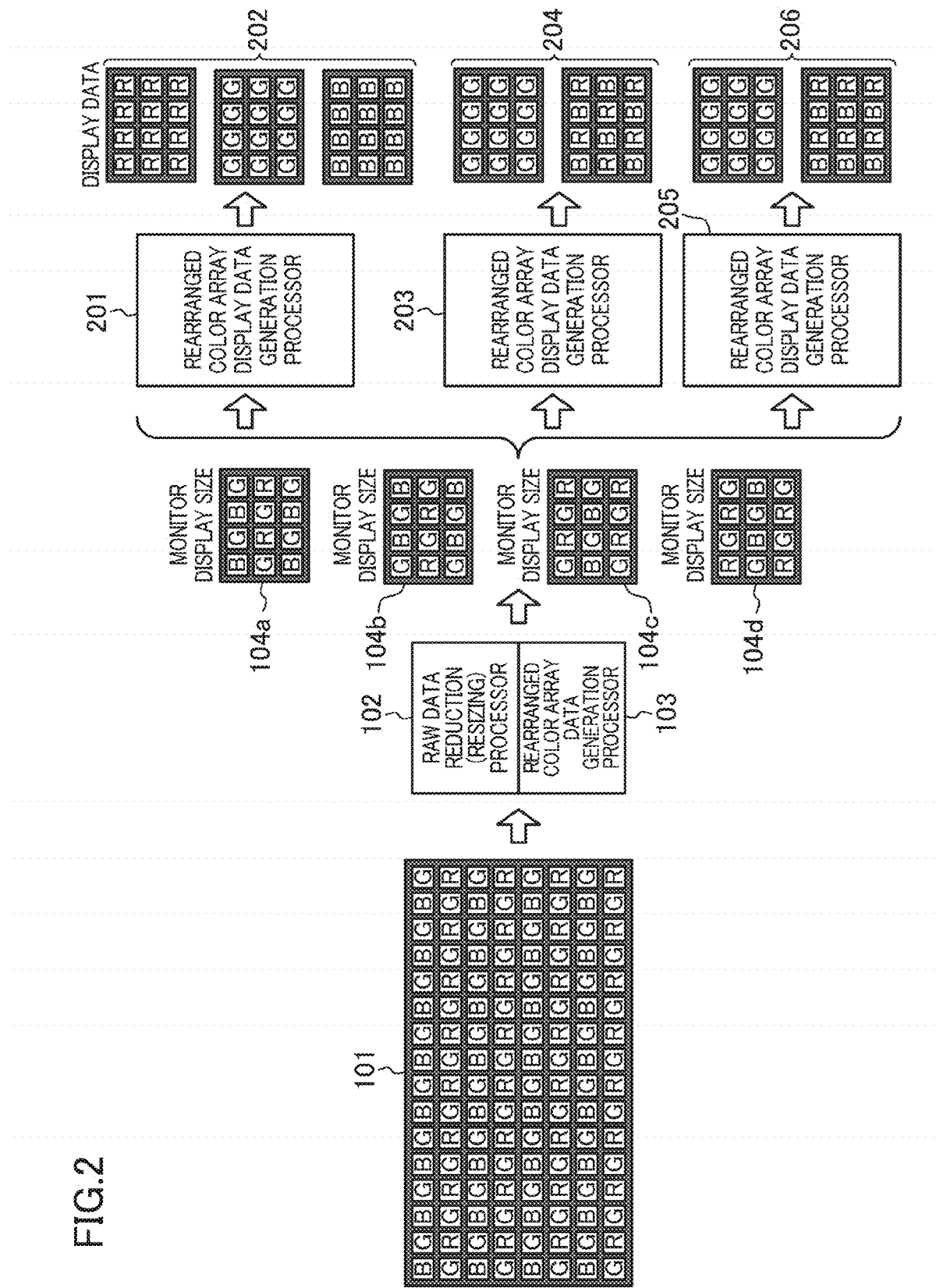
FIG. 2 schematically illustrates a configuration of the image processor of the embodiment.

FIG. 2 schematically illustrates image processing according to the present disclosure in which one or more types of reduced-size images for display constituted by color information of RAW image data serving as an original image are generated and rearranged color array RAW data is also generated.

In FIG. 2, the RAW image data 101 obtained from the single-sensor color imaging device is reduced (resized) to RAW image data of a monitor display size in a RAW data reduction (resizing) processor 102 having an internal processing function of the pretreatment section 105, and a rearranged color array data generation processor 103 generates and outputs four types of Bayer pattern data 104a, 104b, 104c, and 104d having different types of color array information and being within a 2×2 pixel range including a reference pixel position.

In the four types of Bayer pattern data, all the colors of R, G, and B are present in an arbitrary pixel position. Rearranged color array display data generation processors 201, 203, and 205 select and process the colors of R, G, and B of an original image, and thereby, display data having a color array conforming to the input type of the monitor 118 is generated by generating rearranged color array display data (1)-(3) as follows:

(1) rearranged color array display data 202 constituted by individual three data surfaces of R plain data, G plain data, and B plain data;

(2) rearranged color array display data 204 constituted by two data surfaces of G plain data and a square grid data of B and R; and (3) rearranged color array display data 206 constituted by two data surfaces of G plain data and vertically striped pattern data of B and R The use of the rearranged color array display data generation processors 201, 203, and 205 enables generation of display data having any color array as well as the above color array display data (1)-(3). The rearranged color array data generation processor 103 generates four types of rearranged color array data 104a-104d. In a case where one (e.g., 104a) of the rearranged color array data 104a-104d is display data having a color array conforming to input characteristics of the monitor 118 without change, only this rearranged color array display data (i.e., 104a) is generated and output directly to the monitor 118.

To achieve an advantage of the present disclosure of displaying an original image on a monitor with a minimum frame delay, the generated rearranged color array display data described above is input directly to the display processor 117 via the data path DPth(1) illustrated in FIG. 1, and is also temporarily stored in the memory section 108 via the data path DPth(2) and read out again from the memory section 108 to be input to the display processor 117.

Figure 3:
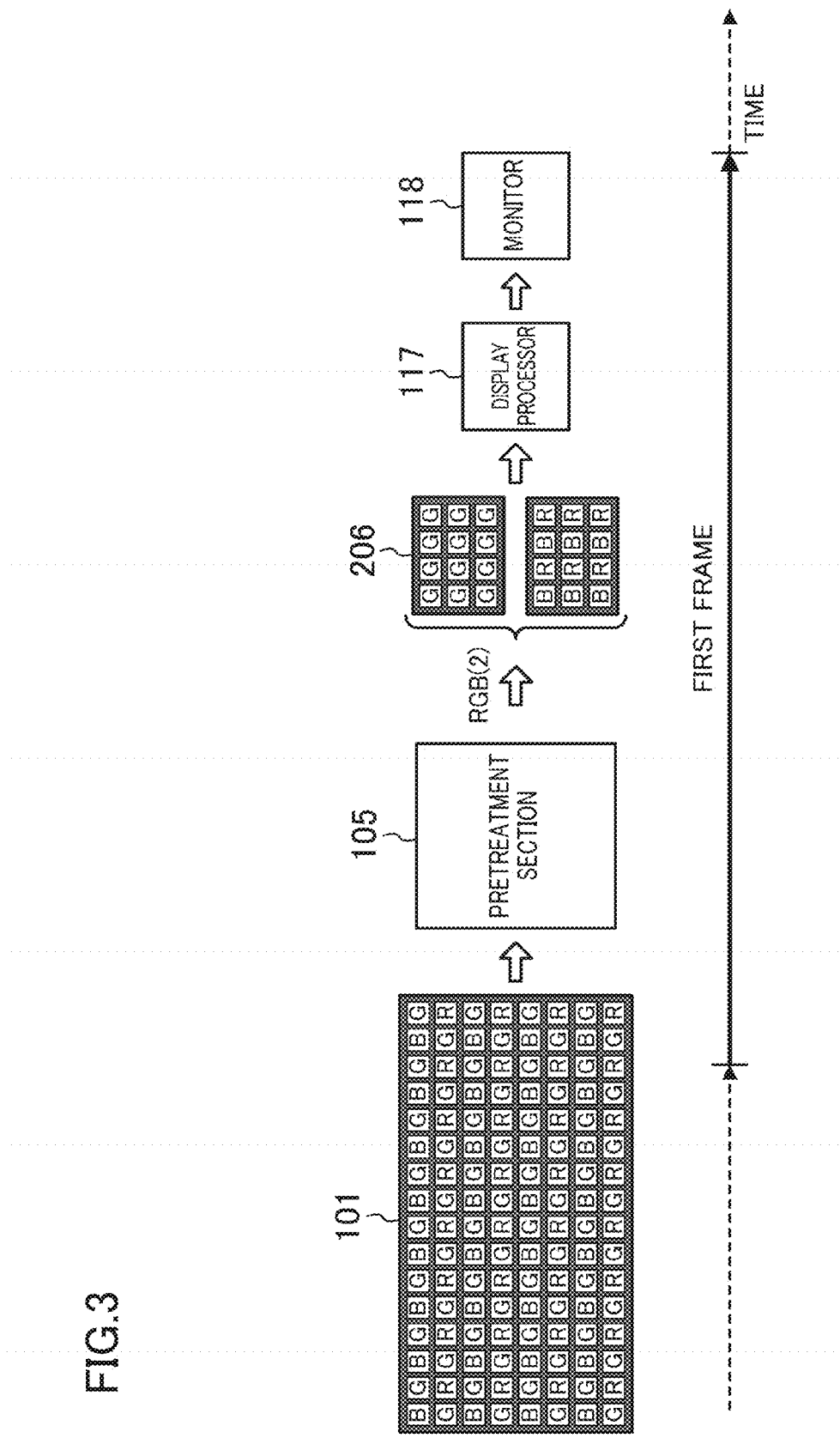
FIG. 3 illustrates a configuration of the image processor in which data is directly transferred from a pretreatment section to a display processor without a frame delay.

FIG. 3 illustrates a configuration in which data is directly transferred from the pretreatment section 105 to the display processor 117 without a frame delay.

In the configuration illustrated in FIG. 3, a period in which the RAW original image 101 from the imaging device is input to the pretreatment section 105 is defined as a first frame period, and pipeline processes are performed in this first frame period such that display data 206 constituted by two data surfaces of G plain data and a vertically striped pattern data of blue (B) and red (R) is directly input to the display processor 117 via the data path DPth(1) illustrated in FIG. 1 and displayed on the monitor 118. In this case, a subject original image is displayed on the monitor without a frame delay.

Figure 4:
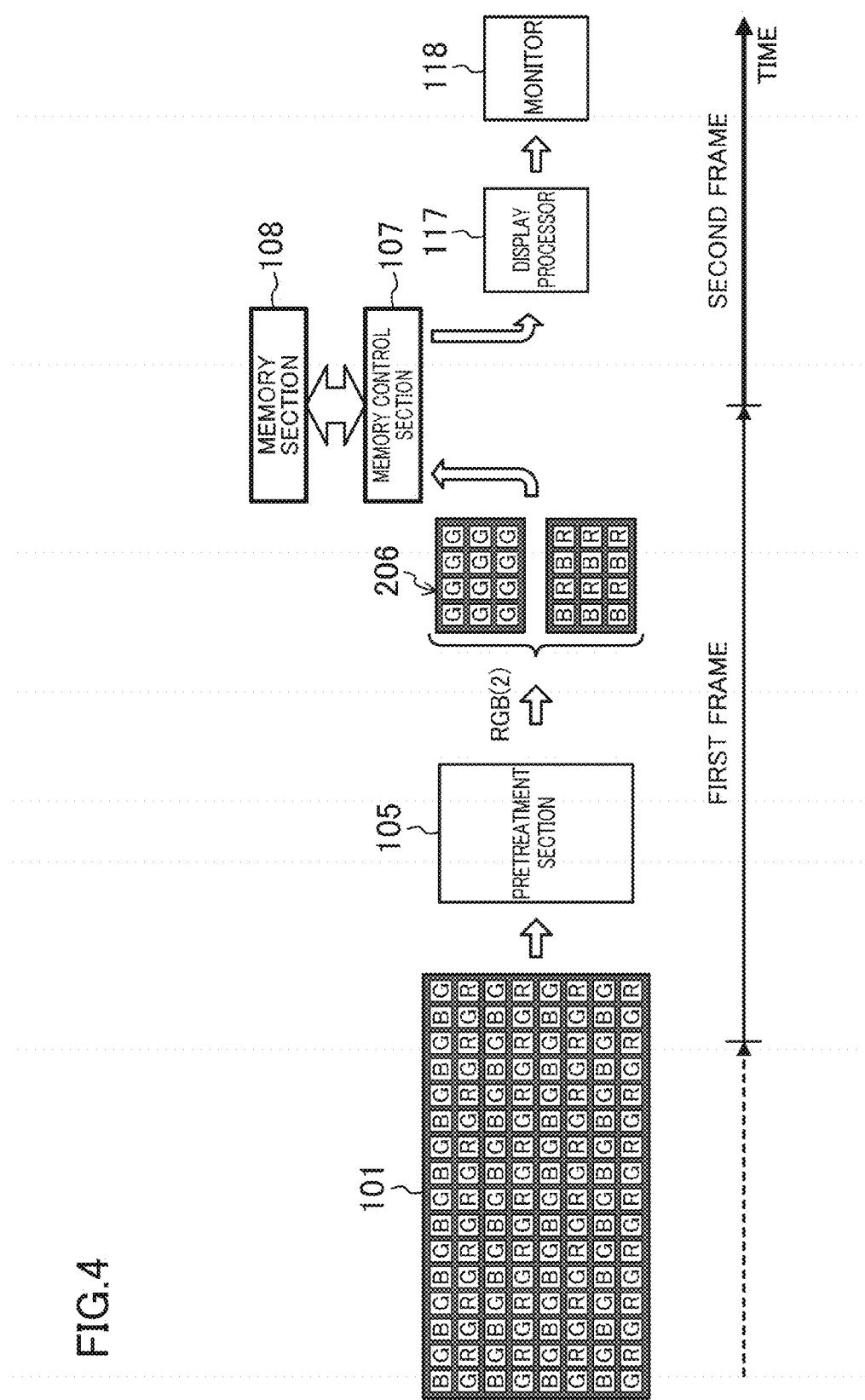
FIG. 4 illustrates a configuration in which data is transferred from the pretreatment section to the display processor via the memory section with one frame delay in the image processor.

FIG. 4 illustrates a configuration in which data is transferred from the pretreatment section 105 to the display processor 117 via the memory section 118 with one frame delay.

In the configuration illustrated in FIG. 4, a period in which the RAW original image 101 from the imaging device is input to the pretreatment section 105 is defined as a first frame period, and display data 206 constituted by two data surfaces of the G plain data generated through the pipeline processes in the first frame period and vertically striped pattern data of blue (B) and red (R) is written in the memory section 108 via the data path DPth(2) and the memory control section 107. In the next second frame period, the display data 206 is input to the display processor 117 and is displayed on the monitor 118. The frame delay in this case corresponds to one frame period in which the subject original image is displayed on the monitor 118.

In the above description, the display data is display data 206 constituted by two data surfaces of the G plain data and the vertically striped pattern data of blue (B) and red (R). Alternatively, as illustrated in FIG. 2, another display data having an arbitrary color array pattern and constituted by multiple data surfaces can also be displayed on the monitor 118 with a similar frame delay.

(First Specific Example of Reduction (Resizing) Processor and Rearranged Color Array Data Generation Processor)

Figure 5:
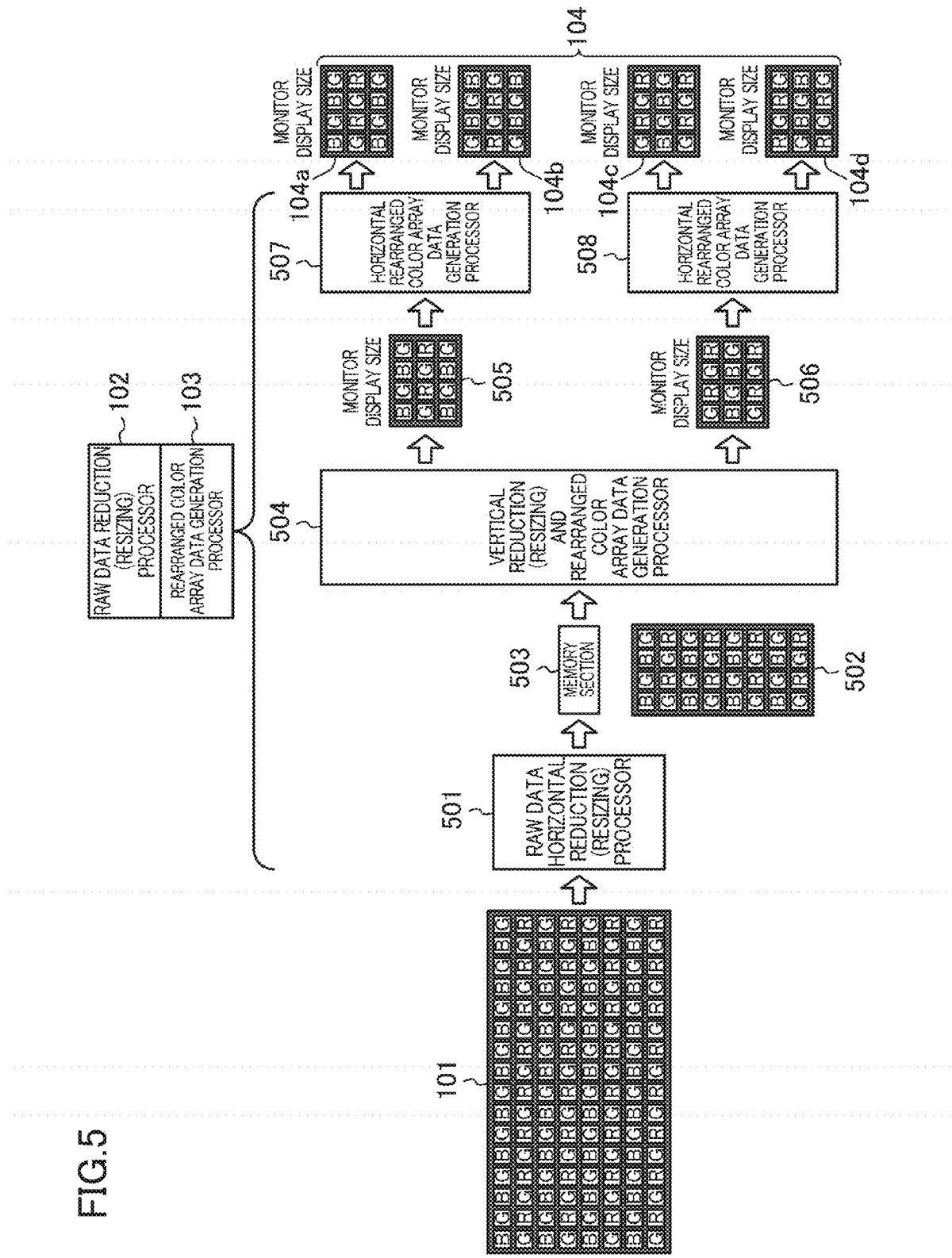
FIG. 5 illustrates an internal configuration of the pretreatment section of the image processor.

FIG. 5 illustrates a specific configuration of the RAW data reduction resizing section 102 and the rearranged color array data generation processor 103 that perform internal signal processing of the pretreatment section 105.

In the configuration illustrated in FIG. 5, to generate four types of Bayer pattern data 104a-104d having different types of color array information in the range of 2×2 pixels including the reference pixel position and reduced to a display size, the image processing of this embodiment includes a first horizontal reduction (resizing) processor 501, a memory section (a memory device) 503, a vertical reduction (resizing) and rearranged color array data generation processor 504, and rearranged color array data generation processors 507 and 508. The first horizontal reduction (resizing) processor 501 reduces the RAW image data 101 obtained by the single-sensor color imaging device to an image of an arbitrary size in an input line direction. The memory section (the memory device) 503 temporarily stores the image data subjected to the horizontal resizing. The vertical reduction (resizing) and rearranged color array data generation processor 504 generates two types of Bayer pattern data 505 and 506 by performing reduction (resizing) on a plurality of pieces of reduced line data read out from the memory section 503, in a vertical direction orthogonal to the input line direction. The rearranged color array data generation processors 507 and 508 generate two types of Bayer pattern data in the input line direction again from each of the two types of Bayer pattern data subjected to the reduction (resizing) processes in the horizontal direction and the vertical direction.

Referring now to FIG. 5, the case of generating four types of Bayer pattern data 104a-104d having different types of color array information and reduced to a display size within a 2×2 pixel range will be described.

In the reduction (resizing) to the display size in the first horizontal reduction (resizing) processor 501 that reduces the image to an image of an arbitrary size in the input line direction, the first horizontal reduction (resizing) processor 501 generates image data 502 that is reduced only in the horizontal direction with a reduction ratio K1 and is of a horizontal size of the display size.

The image data 502 obtained through the horizontal reduction (resizing) is temporarily written in the memory section 503 in units of line data. At the same time, data corresponding to a plurality of lines is read out from the memory section 503, and a reduction (resizing) process in the vertical direction, which is the next process, is performed. Then, the data is reduced to a vertical size of the display size in the vertical direction with the ratio K1 that is also used in the horizontal reduction by using the vertical reduction (resizing) and rearranged color array data generation processor 504 to replace colors between even-numbered lines and odd-numbered lines in the vertical direction. In this manner, two types of display size Bayer pattern data 505 and 506 having different color arrays are obtained.

Thereafter, using the two types of Bayer pattern data 505 and 508, the rearranged color array data generation processors 507 and 508 that generate two types of Bayer pattern data in the input line direction again replace colors between even-numbered pixels and odd-numbered pixels in the horizontal direction, thereby additionally generating two types of Bayer pattern data. In this manner, four types of Bayer pattern data 104 reduced to the display size in a 2×2 pixel range and having different types of color array information are generated.

(Second Specific Example of Reduction (Resizing) Processor and Rearranged Color Array Data Generation Processor)

Figure 6:
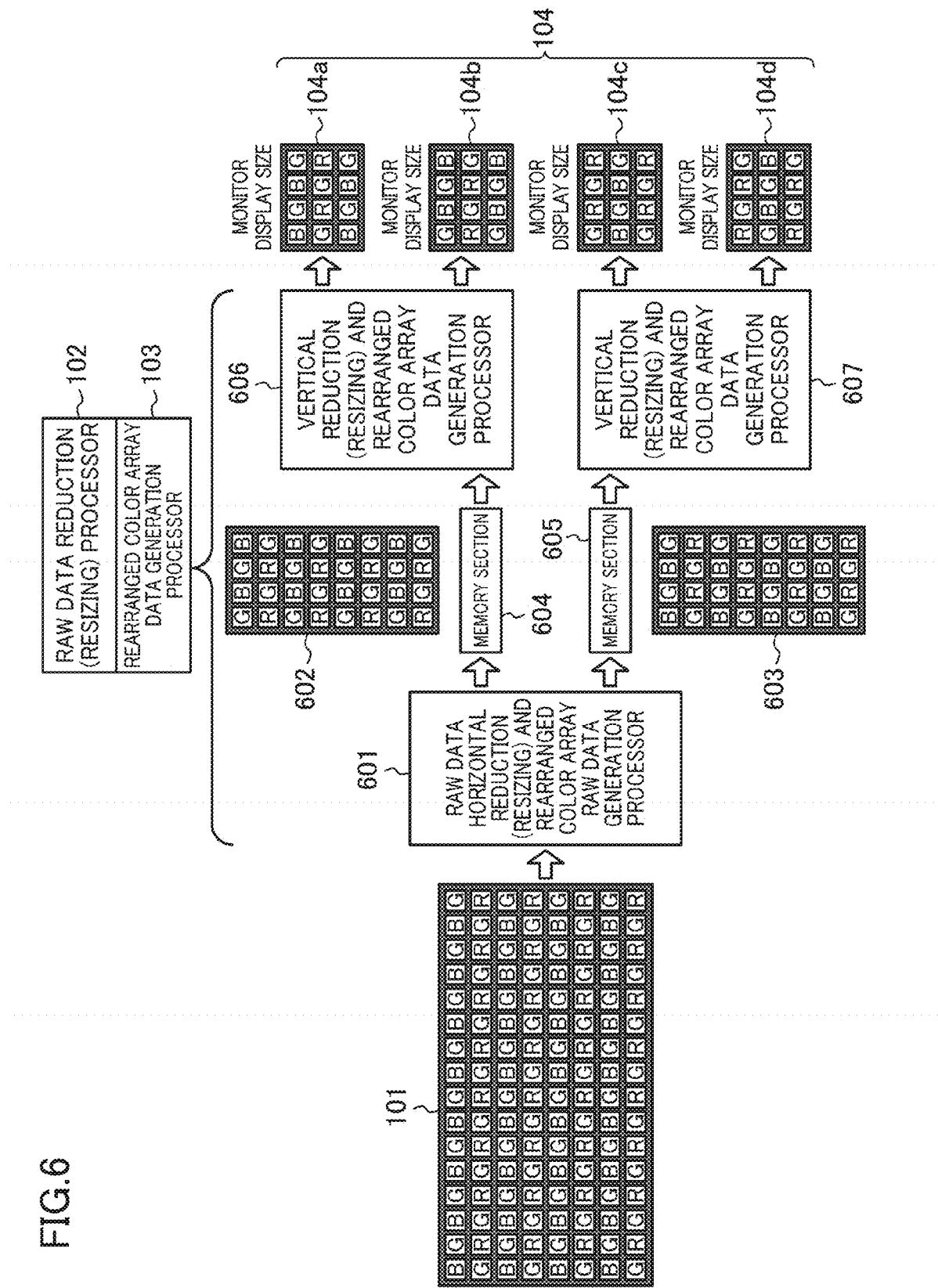
FIG. 6 illustrates another internal configuration of the pretreatment section of the image processor.

FIG. 6 illustrates a second specific example of configurations of the RAW data reduction resizing section 102 and the rearranged color array data generation processor 103 that perform internal signal processing of the pretreatment section 105.

In the configuration illustrated in FIG. 6, to generate four types of Bayer pattern data 104 reduced to the display size within a 2×2 pixel range including the reference pixel position, the image processing of this embodiment includes a horizontal reduction (resizing) and rearranged color array data generation processor 601, memory sections 604 and 605, and vertical reduction (resizing) and rearranged color array data generation processors 606 and 607. The horizontal reduction (resizing) and rearranged color array data generation processor 601 reduces the RAW image data 101 obtained from the single-sensor color imaging device to an image of an arbitrary size in the input line direction and generates two types of Bayer pattern data 602 and 603. The memory sections 604 and 605 temporarily store the two types of Bayer pattern data subjected to the horizontal resizing. The vertical reduction (resizing) and rearranged color array data generation processors 606 and 607 additionally generate two types of Bayer pattern data by performing reduction (resizing) in the vertical direction orthogonal to the input line direction on a plurality of pieces of reduced line data read out from the memory sections 604 and 605, and consequently, generate four types of Bayer pattern data 104a, 104b, 104c, and 104d in total.

Now, the case of generating four types of Bayer pattern data 104 reduced to the display size within a 2×2 pixel range and having different types of color array information will be described as operation of the configuration illustrated in FIG. 6.

In the reduction (resizing) to the display size in the horizontal reduction (resizing) and rearranged color array data generation processor 601 that reduces the image to an image of an arbitrary size in the input line direction and generates two types of Bayer pattern data 602 and 603, the processor 601 first generates Bayer pattern data that is reduced only in the horizontal direction with the reduction ratio K1 and is of a horizontal size of the display size. In addition, the colors of even-numbered pixels and the odd-numbered pixels are replaced with each other in the horizontal direction. In this manner, two types of Bayer pattern data 602 and 603 are generated.

The two types of Bayer pattern data 602 and 603 subjected to the horizontal reduction (resizing) is individually written in the memory sections 604 and 605 temporarily in units of line data. At the same time, data corresponding to a plurality of lines is read out from the memory sections 604 and 605 individually, and a reduction (resizing) process in the vertical direction, which is the next process, is performed. Then, the two vertical reduction (resizing) and rearranged color array data generation processors 606 and 607 reduce the data to an image of a vertical size of the display size in the vertical direction with the ratio K1 that is also used in the horizontal reduction. The colors of the even-numbered lines and the odd-numbered lines are replaced with each other in the vertical direction, thereby generating two types of display size Bayer pattern data having different color arrays. In this manner, four types of display size Bayer pattern data 104a, 104b, 104c, and 104d are obtained in total.

Through the foregoing processes, the four types of Bayer pattern data 104 reduced to the display size within the 2×2 pixel range and having different types of color array information are generated.

(General Description of Reduction (Resizing) Process and Rearranged Color Array Data Generation Process)

Figure 7:
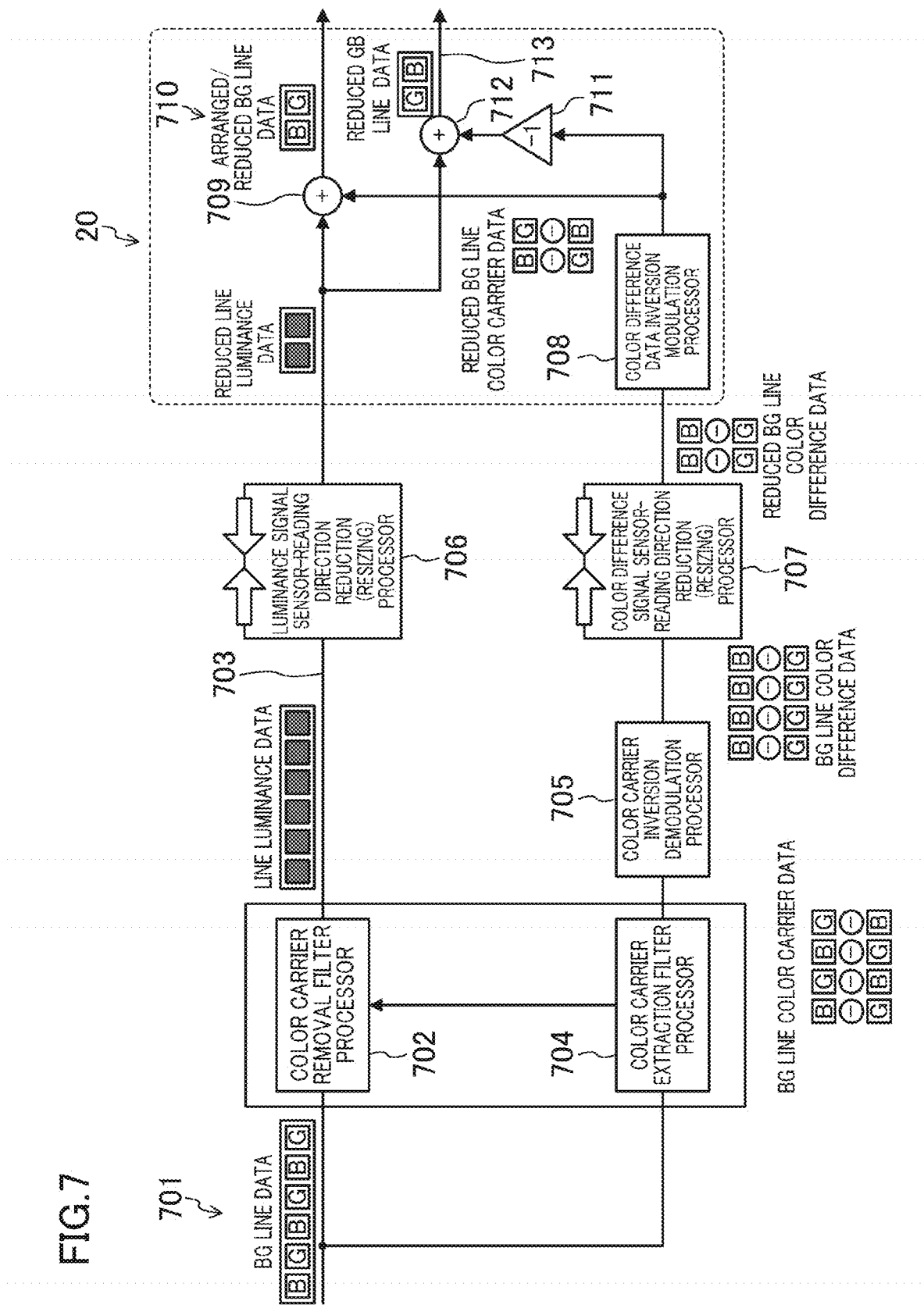
FIG. 7 illustrates internal configurations of a horizontal reduction (resizing) processor and a rearranged color array data generation processor in the pretreatment section.

FIG. 7 illustrates an example of a configuration for internal processing in the RAW data reduction (resizing) processor 102 and the rearranged color array data generation processor 103 that generate two types of Bayer pattern data 710 and 711. Specifically, in this configuration, to generate four types of Bayer pattern data 104 having different types of color array information, an image is reduced to an arbitrary size in the input line direction, and in addition, colors of the even-numbered pixels and the odd-numbered pixels are replaced with each other in the horizontal direction. In this manner, the two types of Bayer pattern data 710 and 713 are generated. This internal processing configuration implements the RAW data horizontal reduction (resizing) processor 501 and the horizontal rearranged color array data generation processors 507 and 508 illustrated in FIG. 5, and the RAW data horizontal reduction (resizing) and horizontal rearranged color array data generation processor 601 illustrated in FIG. 6.

Figure 8B:
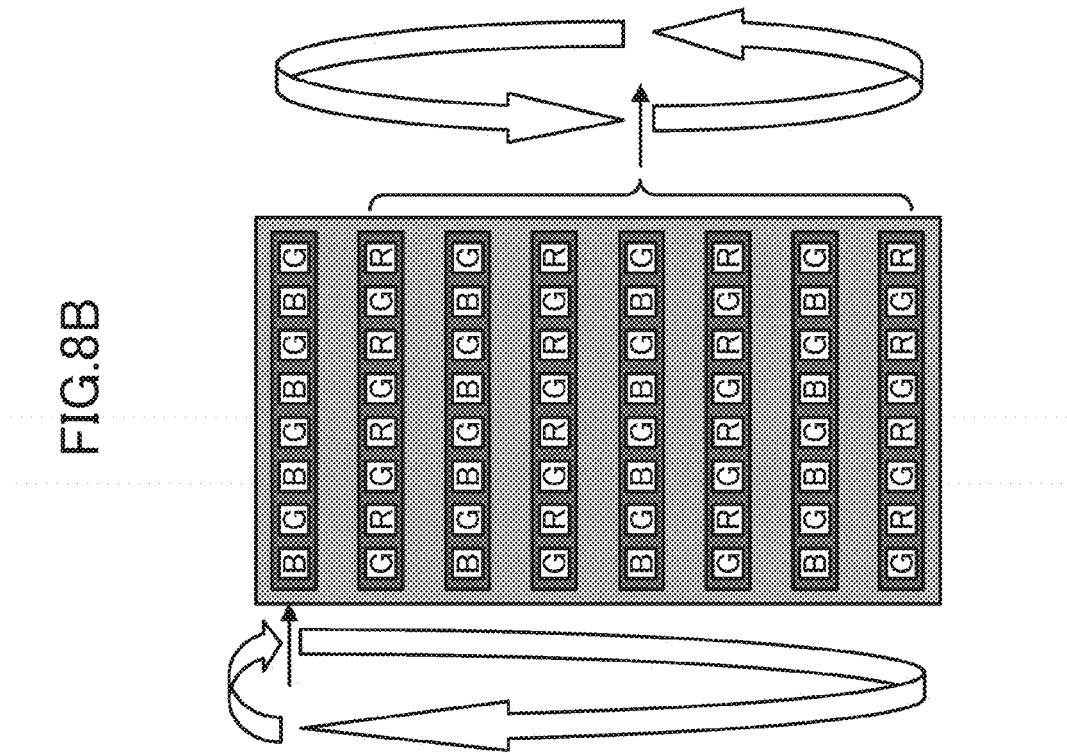
FIG. 8B illustrates write operation and read operation of the line memory at the next line cycle timing.
Figure 8A:
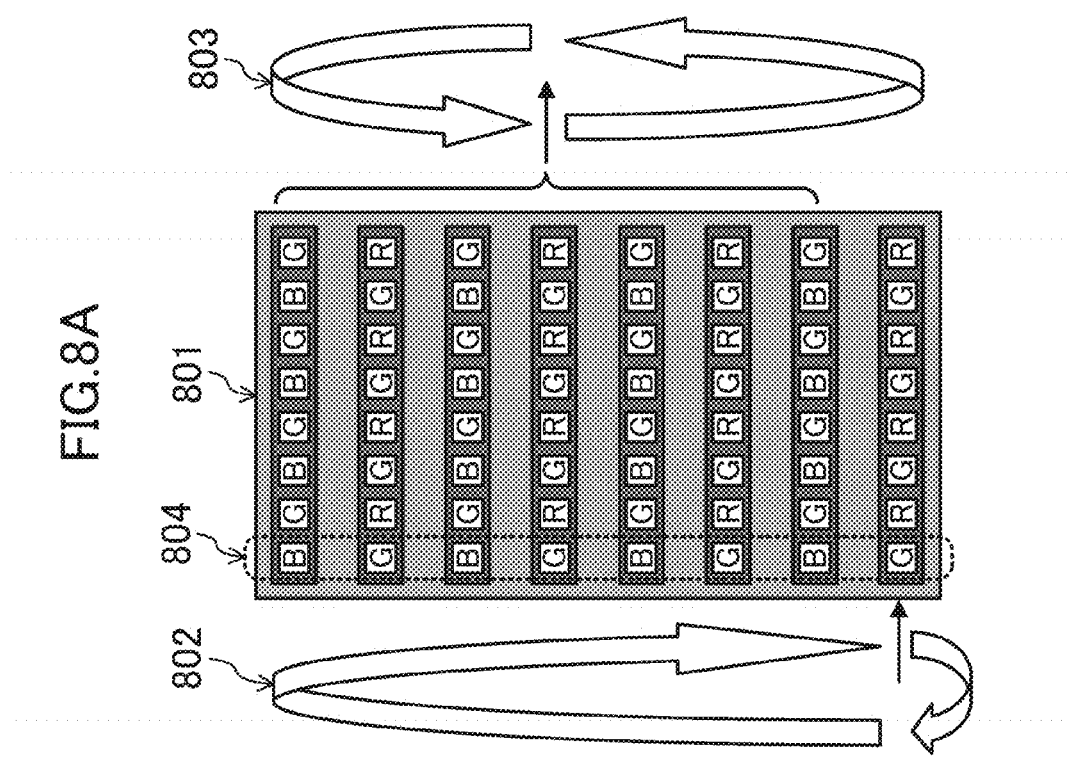
FIG. 8A illustrates write operation and read operation of a line memory.

FIGS. 8A and 8B illustrate examples of the technique of writing line data in a plurality of line memories and the technique of reading a plurality of pieces of horizontal line data from a plurality of line memories 801 at a time by using memory sections 503, 604 and 607 that temporarily store horizontally resized image data in units of line data.

Figure 9:
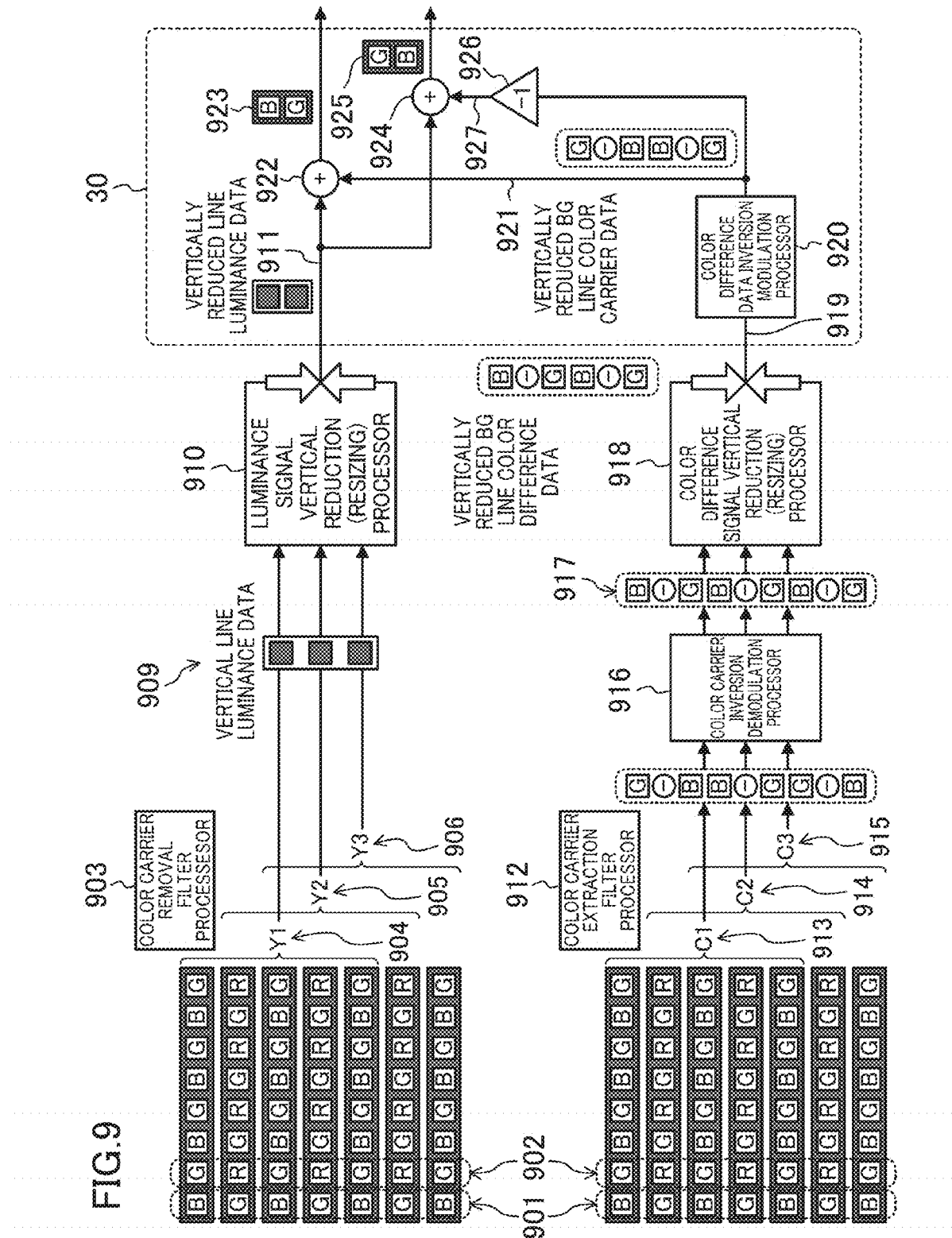
FIG. 9 illustrates an internal configuration of a vertical reduction (resizing) processor and a rearranged color array data generation processor of the pretreatment section.

FIG. 9 illustrates an example of a configuration for internal processing that generates two types of Bayer pattern data 923 and 925 from a plurality of pieces of horizontally reduced line data by performing reduction (resizing) in the vertical direction orthogonal to the input line direction and by replacing colors of even-numbered lines and odd-numbered lines with each other in the vertical direction. This internal processing configuration implements the RAW data vertical reduction (resizing) and rearranged color array data generation processors 504, 606, and 607 illustrated in FIGS. 5 and 6.

First, as illustrated in FIG. 7, a horizontal reduction (resizing) process and a rearranged color array process are selectively performed in a sensor-reading direction, and an output of these processes is written in line memories illustrated in FIGS. 8A and 8B. At the same time, data corresponding to a series of lines in the image subjected to the horizontal reduction (resizing) process in the sensor-reading direction is read out from the line memories, and a plurality of vertical reduction (resizing) processes and rearranged color array processes are concurrently performed, in the vertical direction, on pieces of data at the same position in the sensor-reading direction on a plurality of lines as illustrated in FIG. 9.

In this case, the vertical reduction (resizing) processes are different from the horizontal reduction (resizing) process in the sensor-reading direction described above, and are performed based on the process of determining whether or not an output of an operation which is performed for a plurality of lines at a time is to be used on a line-by-line basis. Then, in the vertical reduction (resizing) processes, images that have been reduced (resized) with different ratios in the vertical direction are obtained as intermittent outputs from the lines.

Further, in the first specific example illustrated in FIG. 5, an arbitrary image is selectively subjected to only the rearranged color array process in the sensor-reading direction among the internal processes illustrated in FIG. 7, thereby generating four types of Bayer pattern data 104 reduced to the display size within the 2×2 pixel range and having different types of color array information.

A main feature of this embodiment is in a flow of image processing and the combination and order of processes. Specifically, in the first specific example of FIG. 5, the process of FIG. 7, the process of FIGS. 8A and 8B, the process of FIG. 9, and the process of FIG. 7 are combined and performed in this order to generate four types of Bayer pattern data 104 reduced to the display size within the 2×2 pixel range and having different types of color array information. On the other hand, in the second specific example of FIG. 6, the process of FIG. 7, the process of FIGS. 8A and 8B, and the parallel processes of FIG. 9 are combined and performed in this order to generate four types of Bayer pattern data 104 reduced to the display size within the 2×2 pixel range and having different types of color array information.

The processes illustrated in FIGS. 7, 8A, 8B, and 9 constitute the technique of generating reduced-size RAW data with high quality and high resolution without occurrence of aliasing noise in performing a reduction (resizing) process and a plurality of rearranged color array processes on RAW data. The present disclosure is not intended to limit an internal algorithm, which is a basis of a reduction process with high quality, to this specific technique uniquely. The internal processing algorithm employed in this embodiment is a procedure capable of obtaining a reduction process with high quality through a small number of steps in order to reduce redundant processes, which is a purpose of the present disclosure. That is, the internal processing algorithm employed in this embodiment is an algorithm for a reduction process and a rearranged color array process suitable for obtaining image processing of the present disclosure.

(Specific Example of Horizontal Reduction (Resizing) Process and Rearranged Color Array Data Generation Process)

Referring now to FIG. 7, the horizontal reduction (resizing) process and the rearranged color array process in the sensor-reading direction that are performed in the horizontal reduction (resizing) processor 501, the rearranged color array data generation processors 507 and 508, and the horizontal reduction (resizing) and rearranged color array data generation processor 601 illustrated in FIGS. 5 and 6 will be described in detail.

The horizontal reduction (resizing) processor 501 in the sensor-reading direction performs a one-dimensional pipeline process, and includes a color carrier removal filter processor (a filter processor) 702, a color carrier extraction filter processor (a filter processor) 704, a color carrier inversion demodulation processor 705, a luminance signal sensor-reading direction reduction (resizing) processor 706, a color difference signal sensor-reading direction reduction (resizing) processor 707, a color difference data inversion modulation processor (a color carrier modulation processor) 708, a first color array reproduction processor (a rearranged color array data generation processor) 709, a sign reversal processor 711, and a second color array reproduction processor (a rearranged color array data generation processor) 712, as illustrated in FIG. 7. The color carrier removal filter processor 702 extracts luminance data from a RAW image 101 by a filter process performed on a RAW line image 701 on a line-by-line basis. The color carrier extraction filter processor 704 extracts color carrier data. The color carrier inversion demodulation processor 705 performs color inversion demodulation on modulated color carrier data to output continuous pieces of color difference data. The luminance signal sensor-reading direction reduction (resizing) processor 706 and the color difference signal sensor-reading direction reduction (resizing) processor 707 reduce (resize) the luminance data and the color difference data independently of each other. The color difference data inversion modulation processor 708 converts the resized color difference data back into color carrier data and performs gain level adjustment on the color carrier data. The first color array reproduction processor 709 recombines the level-adjusted resized luminance data and the modulated color carrier data to generate final first color array data 710. The sign reversal processor 711 performs sign reversal on the modulated color carrier data. The second color array reproduction processor 712 recombines the level-adjusted resized luminance data and the modulated color carrier data to generate second color array data 713.

The processes concerning color rearrangement are performed in the color difference data inversion modulation processor 708 that converts the resized color difference data back into color carrier data and performs gain level adjustment on the color carrier data, the first color array reproduction processor 709, the sign reversal processor 711, and the second color array reproduction processor 712. These processors are included in a rearranged color array data generation processor 20 enclosed by a broken line in FIG. 7.

It will now be described how an image having the Bayer pattern is processed using the horizontal reduction (resizing) process function in the sensor-reading direction described shown in FIG. 7.

The RAW image 101, which is an original image, is a mosaic image in which the pixel positions of the Bayer pattern are maintained, and is typically read out from the imaging section 12 on a line-by-line basis. The RAW line image data 701 of the original image on a line-by-line basis includes two types of lines: RG lines in which red (R) information alternates with green (G) information on a pixel-by-pixel basis; and BG lines in which blue (B) information alternates with G information on a pixel-by-pixel basis. FIG. 7 shows only signal information regarding BG lines.

The two types of line data are processed by the color carrier removal filter processor 702 which removes a color carrier close to a Nyquist frequency varying at intervals of two pixels, so that luminance data $\{\alpha(R+G)\}$ which is an average value of R and G is output for the RG lines, and luminance data $\{\alpha(B+G)\}$ which is an average value of B and G is output for the BG lines.

The two types of line data are also processed by the color carrier extraction filter processor 704 that extracts a color carrier close to the Nyquist frequency varying at intervals of two pixels, so that RG line color carrier data modulated with the Nyquist frequency is output for the RG lines, and BG line color carrier data modulated with the Nyquist frequency is output for the BG lines. The RG line color carrier data and the BG line color carrier data modulated with the Nyquist frequency are processed by the color carrier inversion demodulation processor 705 that performs sign reversal on a pixel-by-pixel basis, to be output as continuous RG line color difference data and BG line color difference data.

When the extracted luminance data and color difference data are subjected to reduction (resizing) in the sensor-reading direction with the same reduction ratio, a luminance data band-limiting filter process and a color difference data band-limiting filter process (not shown in FIG. 7) having different characteristics are performed on the luminance data and the color difference data, respectively, so as to reduce aliasing noise occurring after the reduction. To achieve an effective assembly, the limitation of frequency characteristics is preferably performed at a time by the color carrier removal filter processor 702 and the color carrier extraction filter processor 704. In this case, assuming that the final recording format is JPEG, TIFF, or MPEG, the color difference band limitation is set to be smaller than or equal to ½ of the luminance band limitation. The band-limited luminance data is subjected to linear interpolation/decimation in accordance with a reduction ratio in the luminance signal sensor-reading direction reduction (resizing) processor 706. On the other hand, the band-limited color difference data is subjected to linear interpolation/decimation in accordance with a reduction ratio in the horizontal reduction (resizing) processor 507 in the color difference signal sensor-reading direction.

The two types of continuous color difference data $\{\beta(R-G), \beta(B-G)\}$ subjected to the horizontal reduction (resizing) in the sensor-reading direction on a line-by-line basis is processed in the color difference data inversion modulation processor 708 that performs sign reversal at every pixel and is an equivalent process to modulation with the Nyquist frequency varying at intervals of two pixels. As a result, two types of reduced RG line color carrier data and reduced BG line color carrier data, i.e., first $\{\beta(R-G), -\beta(R-G)\}$ and $\{\beta(B-G), -\beta(B-G)\}$, having a different sign for each pixel of each line data are obtained. At the same time, the sign reversal processor 711, which performs sign reversal on the color carrier data, generates two types of reduced RG line color carrier data and reduced BG line color carrier data, i.e., second $\{-\beta(R-G), \beta(R-G)\}$, $\{-\beta(B-G), \beta(B-G)\}$.

The resized (reduced) line luminance data is then processed in the color array reproduction processor 709 that adds the resized reduced line luminance data and the resized color carrier data together, so that the first and second reduced RG line color carrier data and the first and second reduced BG line color carrier data are recombined together for each line. As a result, reduced (resized) RG lines and GR lines in which red (R) information alternates with green (G) information for each pixel and reduced (resized) BG lines 710 and GB lines 713 in which blue (B) information alternates with green (G) information for each pixel are output.

The recombination of the RG lines is indicated by the following mathematical expression. Initially, when it is assumed that $\alpha=0.5$ and $\beta=0.5$, the luminance data $\{\alpha(R+G)\}$ and the color carrier data $\{\beta(R-G), -\beta(R-G)\}$ are luminance data $\{0.5(R+G)\}$ and color carrier data $\{0.5(R-G), -0.5(R-G)\}$. As luminance data and color carrier data are repeatedly added for every pixel, $0.5\{(R+G)+(R-G)\}$, $0.5\{(R+G)-(R-G)\}$, . . . are repeatedly calculated. Thus, RG line data is reproduced as R, G, R, G, . . . . The sign reversal on the color carrier data causes GR line data to be reproduced as G, R, G, R, . . . .

Similarly, the recombination of the BG lines is indicated by the following mathematical expression. Initially, when it is assumed that $\alpha=0.5$ and $\beta=0.5$, the luminance data $\{\alpha(B+G)\}$ and the color carrier data $\{\beta(B-G), -\beta(B-G)\}$ are luminance data $\{0.5(B+G)\}$ and color carrier data $\{0.5(B-G), -0.5(B-G)\}$. As luminance data and color carrier data are repeatedly added for every pixel, $0.5\{(B+G)+(B-G)\}$, $0.5\{(B+G)-(B-G)\}$, . . . are repeatedly calculated. Thus, BG line data is reproduced as B, G, B, G, . . . . The sign reversal on the color carrier data causes GB line data to be reproduced as G, B, G, B, . . . .

The horizontal reduction (resizing) process function in the sensor-reading direction shown in FIG. 7 can be used in the processors 501, 507, and 508 illustrated in FIG. 5 and in the processor 601 illustrated in FIG. 6.

The horizontal reduction (resizing) processor 501 illustrated in FIG. 5 outputs one of the two types of reduced line data having different color arrays to a next processor. The rearranged color array data generation processors 507 and 508 perform no reduction processes in the horizontal direction and output two types of reduced line data having different color arrays. In addition, the horizontal reduction (resizing) and rearranged color array data generation processor 601 in FIG. 6 outputs two types of reduced line data subjected to horizontal reduction and having different color arrays.

Referring now to FIGS. 8A and 8B, it will be described how reduced RAW image data processed by the horizontal reduction (resizing) processor 501 and the horizontal reduction (resizing) and rearranged color array data generation processor 601 is temporarily written in a plurality of line memories serving as an example of the memory sections 503, 604, and 605 and, at the same time, a plurality of pieces of horizontally reduced line RAW data are read out from the line memories.

FIG. 8A shows write operation and read operation of line memories. FIG. 8B shows write operation and read operation of the line memories at the next line cycle timing following FIG. 8A. In FIGS. 8A and 8B, reference character 801 denotes a line memory including eight lines. Reference character 802 denotes a data write cycle for the line memory 801. A write control with respect to the eight lines is performed such that the lines are successively subjected to write operation on a line-by-line basis and in a ring cyclic manner. Reference character 803 denotes a data read cycle for the line memory 801. The lines are successively subjected to read operation in a ring cyclic manner as in the write control, but memory data on seven of the eight lines is selected together in each read operation step.

In the example of FIGS. 8A and 8B, in order to minimize the capacity of the line memory 801 to be used, the position of the leading line of the 7-line simultaneous cyclic read operation is delayed by one line from the position of a write line. By separating the write line from the read lines, write operation and read operation can be asynchronously performed.

A plurality of successive lines of RAW resized data from the horizontally reduced (resized) RAW images 502, 602, and 603 are read out together from the line memory 801 illustrated in FIGS. 8A and 8B. Thus, in the first specific example of FIG. 5, data 804 located at the same position in the sensor-reading direction on the plurality of lines is vertically processed in the vertical reduction (resizing) and rearranged color array data processor 504, to obtain resized RAW images 505 and 606. In the second specific example of FIG. 6, the vertical reduction (resizing) and rearranged color array data processors 606 and 607 perform vertical processing, to obtain four types of resized RAW image 104 having different color arrays.

In this case, the processes in the vertical reduction (resizing) and rearranged color array data processors 504, 606, and 607 are different from that in the horizontal reduction (resizing) processor 501 in the sensor-reading direction. These processors 504, 606, and 607 perform vertical reduction (resizing) processes by reducing the number of output lines depending on the result of the determination process of determining whether or not any image processing output data from a plurality of lines is utilized as effective data on a line-by-lie basis.

(Specific Example of Vertical Reduction (Resizing) Process and Rearranged Color Array Data Process)

FIG. 9 illustrates an example of a configuration for internal processing in the vertical reduction (resizing) and rearranged color array data processors 504, 606, and 607 that generate two types of Bayer pattern data 923 and 925. Specifically, in this configuration, to generate two types of Bayer pattern data having different types of color array information, an image is reduced to an arbitrary in direction vertical to the input line direction, and in addition, colors of the even-numbered pixels and the odd-numbered pixels are replaced with each other in the vertical direction.

Similarly to the horizontal reduction (resizing) process in a sensor-reading direction illustrated in FIG. 7, the vertical reduction (resizing) and rearranged color array data processors 504, 606, and 607 illustrated in FIG. 9 perform a two-line process including a luminance signal process and a color difference signal process.

Note that, FIG. 9 illustrates an example in which seven pixels located at the same horizontal position in seven lines of RAW image serving as input data are handled as a processing unit.

The vertical reduction (resizing) and rearranged color array data process illustrated in FIG. 9 is performed by a color carrier removal filter processor (a filter processor) 903, a color carrier extraction filter processor (a filter processor) 912, a color carrier inversion demodulation processor (a vertical color carrier inversion demodulation processor) 916, a luminance signal vertical reduction (resizing) processor (a vertical reduction resizing processor) 910, a color difference signal vertical reduction (resizing) processor (a vertical reduction resizing processor) 918, a color difference data inversion modulation processor (a vertical color difference data inversion modulation processor) 920, a first color array reproduction processor 922, a sign reversal processor 926, and a second color array reproduction processor 924. The color carrier removal filter processor 903 extracts luminance data in the vertical direction from the seven lines of RAW image. The color carrier extraction filter processor 912 extracts vertical color carrier data. The color carrier inversion demodulation processor 916 performs color inversion demodulation on the vertically modulated color carrier data to output color difference data that is continuous in the vertical direction. The luminance signal vertical reduction (resizing) processor 910 and the color difference signal vertical reduction (resizing) processor 918 perform vertical reduction (resizing) on the obtained vertical line luminance data 909 and color difference data independently of each other. The color difference data inversion modulation processor 920 converts the resized color difference data back into color carrier data and performs gain level adjustment on the color carrier data. The first color array reproduction processor 922 recombines the level-adjusted resized luminance data and the modulated color carrier data to generate final first color array data 923. The sign reversal processor 926 performs sign reversal on the modulated color carrier data. The second color array reproduction processor 924 recombines the level-adjusted resized luminance data and the modulated color carrier data after sign reversal, to generate final second color array data 925.

The processes concerning color rearrangement are performed by the color difference data inversion modulation processor 920 that converts the resized color difference data back into color carrier data and performs gain level adjustment on the color carrier data, the first color array reproduction processor 922, the sign reversal processor 926, and the second color array reproduction processor 924. These processors 920, 922, 926, and 924 are included in a rearranged color array data generation processor 30 enclosed by a broken line in FIG. 9.

It will now be specifically described how an image having a Bayer pattern is subjected to a reduction (resizing) process and a rearranged color array data process by using the vertical reduction (resizing) and rearranged color array data process function described with reference to FIG. 9.

As shown in a processing unit 901 in the vertical direction in FIG. 9, a RAW image subjected to the horizontal resizing process holds a mosaic pattern in which the pixel positions of the Bayer array are maintained, and is written in the line memory 801 on a line-by-line basis in a cyclic manner and is read out from a plurality of lines at a time in a cyclic manner as illustrated in FIGS. 8A and 8B. In this embodiment illustrated in FIGS. 8A and 8B, the line memory 801 includes eight lines, and the outputs of seven lines are output together.

The processing units in the first vertical direction from seven-line input data after the horizontal resizing process are vertical data of interest located at the same position in the sensor-reading direction on seven lines, and is one of two types of units: a BG vertical processing unit 901 in which blue (B) information alternates with green (G) information on a pixel-by-pixel basis in the vertical direction; and a GR vertical processing unit 902 in which green (G) information alternates with red (R) information on a pixel-by-pixel basis in the vertical direction.

Data to be these two types of processing units in the vertical direction contains color carrier information close to the Nyquist frequency varying at intervals of two pixels in the vertical direction, and is subjected to a three-line process using luminance data Y1-Y3 corresponding to five lines in the 7-line data in the color carrier removal filter processor 903 that removes the color carrier. In this manner, three types of continuous pieces of luminance data whose positions are shifted from one another by one line in the vertical direction are generated. In this embodiment, each of three types of line luminance data 909 is output by using luminance data Y1-Y3 of five pixels in the vertical direction in the color carrier removal filter processor 903. Each of the pieces of luminance data Y1-Y3 is luminance data that is an average value of blue (B) and green (G) in a BG vertical processing unit 901 in the vertical direction, and is luminance data that is an average value of green (G) and red (R) in the next GR vertical processing unit 902 in the vertical direction. These pieces of luminance data is alternately output in the horizontal direction.

The two types of the vertical processing units 901 and 902 are subjected to a three-line process by using data corresponding to five lines in the 7-line data in the color carrier extraction filter processor 912 that extracts a color carrier close to the Nyquist frequency varying at intervals of two pixels in the vertical direction, and thereby, three types of continuous pieces of color carrier data C1-C3 (913-915) whose positions are shifted from one another by one line in the vertical direction are generated. In the BG vertical direction of the BG vertical processing unit 901, BG color carrier component data modulated with the Nyquist frequency is output. In the GR vertical direction of the GR vertical processing unit 902, GR color carrier component data modulated with the Nyquist frequency is output.

The three pieces of each of the BG color carrier component data and the GR color carrier component data modulated with the Nyquist frequency in the vertical direction are processed by the color carrier inversion demodulation processor 916 that performs sign reversal for each pixel (for each one-line operation) in the vertical direction, and are output as R-G data and B-G data that are continuous in the vertical direction. Here, color difference data C1-C3 is output such that the pixel data positions of the color difference data C1-C3 in the vertical direction are made coincide with those of the luminance data Y1-Y3.

When the data extracted in the vertical direction of the 3-line data, i.e., the luminance data Y1-Y3 and the color difference data C1-C3, are subjected to vertical reduction (resizing) with the same ratio, a luminance band-limiting filter process and a color difference band-limiting filter process (not shown in FIG. 9) having different characteristics are preferably performed on the luminance data and the color difference data, respectively, so as to reduce aliasing noise occurring after the reduction. These processes can also be performed on three lines of the luminance data Y1-Y3 and the color difference data C1-C3. However, to achieve an effective assembly, the limitation of frequency characteristics is applied at a time in the color carrier removal filter processor 903 and the color carrier extraction filter processor 912. In this case, assuming that the final recording format is JPEG, TIFF, or MPEG, the band limitation for color difference data is preferably set to be smaller than or equal to ½ of the band limitation for luminance data.

The luminance signal vertical reduction (resizing) processor 910 performs linear interpolation in the vertical direction by using the three pieces of the luminance data 909, i.e., the vertically band-limited luminance data Y1-Y3, and produces a line decimation output on a line-by-line basis in accordance with a reduction ratio. On the other hand, the color difference signal vertical reduction (resizing) processor 918 performs linear interpolation, similarly to that on the luminance data, in the vertical direction by using three pieces of color difference line data, and produces a line decimation output on a line-by-line basis in accordance with a vertical reduction ratio.

The color difference data reduced (resized) through the line decimation in the vertical direction is processed by the color difference data inversion modulation processor 920 that performs sign reversal for each effective line output, which is an equivalent process for modulating the data with the Nyquist frequency varying at intervals of two pixels in the vertical direction, thereby generating first vertical color carrier data 921 in the vertical direction. This first vertical color carrier data 921 is subjected to sign reversal in the sign reversal processor 926, thereby generating second vertical color carrier data 927.

The vertically reduced (resized) line luminance data 911 obtained through the line decimation in the vertical direction and the first vertical color carrier data 921 are added together in the first color array reproduction processor 922, thereby alternately outputting, in the horizontal direction, horizontally and vertically resized vertical BG data 923 in which blue (B) information alternates with green (G) information in the vertical direction at every pixel, and horizontally and vertically resized vertical GR data (not shown) in which green (G) information alternates with red (R) information in the vertical direction at every pixel.

The vertically reduced (resized) line luminance data 911 obtained through the line decimation in the vertical direction and the second vertical color carrier data 927 are added together in the second color array reproduction processor 924, thereby alternately outputting, in the horizontal direction, horizontally and vertically resized vertical GB data 925 in which green (G) information alternates with blue (B) information in the vertical direction at every pixel, and horizontally and vertically resized vertical RG data (not shown) in which red (R) information alternates with the green (G) information in the vertical direction at every pixel.

The processes concerning two types of color rearrangement in the vertical direction are performed by the first color array reproduction processor 922 and the second color array reproduction processor 924, which output two types of Bayer pattern data 505 and 506 shown in FIG. 5 and two types of Bayer pattern data 104a, 104b, 104c, and 104d shown in FIG. 6.

As described above, in the first embodiment illustrated in FIG. 5, the process of FIG. 7, the process of FIGS. 8A and 8B, the process of FIG. 9, and the process of FIG. 7 are combined and performed in this order to generate four types of Bayer pattern data 104 reduced to the display size within the 2×2 pixel range and having different types of color array information.

In the second embodiment illustrated in FIG. 6, the process of FIG. 7, the process of FIGS. 8A and 8B, and the parallel processes of FIG. 9 are combined and performed in this order to generate four types of Bayer pattern data 104 reduced to the display size within the 2×2 pixel range and having different types of color array information.

Then, the rearranged color array display data generation processors 201, 203, and 205 illustrated in FIG. 2 select and process the colors of red (R), green (G), and blue (B) of the original image, and thereby, generate display data having a color array conforming to the input type of the monitor.

Means for carrying out the present disclosure is not limited to a dedicated image processor (e.g., an image reproduction device or an image processing device), and may be a personal computer. The whole or a part of the image processing may be implemented not only by hardware (e.g., a signal processing circuit), but also by software.

The image processing program for use in image processing may be configured as a separate application software program, or may be incorporated as a part of an application, such as an image processing software program or a file management software program. This image processing program is not limited to applications to a computer system, such as a personal computer, or may be used as an operating program for a central processing unit (CPU) incorporated in an information device, such as a digital camera or a cellular phone.

As described above, an image processor and an image processing method according to the present disclosure can be useful especially for an image data size changing display processor, an electronic still camera, an image data size changing display process program, etc., suitable for a reduction process for display of an original image obtained from a single-sensor color imaging device.

What is claimed is:

1. An image processor capable of generating a reduced-size image from a digital image signal of an original image having pixels of a plurality of colors arranged in a color array with a periodicity, and of displaying the reduced-size image, the image processor comprising:
   a reduction resizing processor configured to reduce an original image from a single-sensor color imaging device and obtain a reduced-size image of a size conforming to a display size of a display monitor; and
   a rearranged color array data generation processor configured to generate, based on the reduced-size image obtained by the reduction resizing processor, one or more types of display reduced-size images by rearranging color information of the original image relative to a reference pixel position.

2. The image processor of claim 1, further comprising a rearranged color array display data generation processor configured to generate one or more types of color array display data conforming to a color pixel array for the display monitor, based on the display reduced-size image generated by the rearranged color array data generation processor.

3. The image processor of claim 1, further comprising:
   a data path through which the display reduced-size image is input from the rearranged color array data generation processor directly to a display processor that performs a display process in accordance with display characteristics of the display monitor; and
   a data path through which the display reduced-size image is input from the rearranged color array data generation processor directly to the display processor via a memory section, wherein
   a memory control section configured to control the memory section selectively performs an image input data path control to input the display reduced-size image from the rearranged color array data generation processor either directly to the display processor or to the display processor via the memory section, depending on an operation mode in shooting.

4. The image processor of claim 1, wherein each of a reduction resizing process in the reduction resizing processor and a rearranged color array data generation process in the rearranged color array data generation processor is allowed to be performed as each of a horizontal process and a vertical process on the original image.

5. The image processor of claim 1, wherein in the reduction resizing processor and the rearranged color array data generation processor,
   a first reduction resizing process is performed on the original image in a sensor-reading direction on a line-by-line basis so that the original image is reduced and resized only in one direction,
   a second reduction resizing process in a vertical direction orthogonal to the sensor-reading direction and a rearranged color array data generation process are performed on one type of multicolor array data that has been reduced and resized only in the one direction, thereby generating two types of multicolor array data that has been two-dimensionally reduced and resized, and a rearranged color array data generation process is performed on the two types of the multicolor array data on a line-by-line basis again, thereby generating a plurality of types of multicolor array data.

6. The image processor of claim 5, wherein
in the reduction resizing processor and the rearranged color array data generation processor,
one type of multicolor array data obtained by reducing and resizing the original image only in a horizontal direction in the first reduction resizing process is written in a memory device,
the one type of the multicolor array data is read out from the memory device on a line-by-line basis in a direction orthogonal to a line direction in write operation, and is subjected to a reduction resizing process and a rearranged color array data generation process again, thereby generating two types of two-dimensionally reduced and resized color array data, and
the two types of the multicolor array data are subjected to rearranged color array data generation process on a line-by-line basis again, thereby generating a plurality of types of multicolor array data.

7. The image processor of claim 6, wherein
in the reduction resizing processor and the rearranged color array data generation processor,
while one type of multicolor array data obtained by reducing and resizing the original image only in one direction in the first reduction resizing process is being written on a line-by-line basis in a line memory including a plurality of lines, data corresponding to a plurality of lines is read out, then luminance data and color carrier data are extracted from a plurality of pieces of vertical data of interest located at an identical position in the sensor-reading direction in the read-out data corresponding to a plurality of lines and are subjected to a reduction resizing process and a rearranged color array data generation process again, and in the reduction resizing process in the vertical direction, the number of output lines relative to the number of input lines is reduced, thereby generating two types of multicolor array data that have been two-dimensionally reduced and resized, and
the two types of the multicolor array data are subjected to a rearranged color array data generation process on a line-by-line basis again, thereby generating a plurality of types of color array data.

8. The image processor of claim 5, wherein
the reduction resizing processor and the rearranged color array data generation processor include:
for a horizontal reduction resizing process and a rearranged color array data generation process,
a filter processor configured to extract luminance data and color carrier data from the original image through a process on a line-by-line basis in the sensor-reading direction;
a color carrier inversion demodulation processor configured to convert the color carrier data into color difference data;
a reduction resizing processor configured to reduce and resize the luminance data and the color difference data independently of each other;
a color carrier modulation processor configured to generate first color carrier data having a different sign for each pixel of the color difference data that has been reduced and resized by the reduction resizing processor and also generate second color carrier data having a different sign from that of the first color carrier data; and a rearranged color array data generation processor configured to recombine the luminance data that has been reduced and resized and the first color carrier data to generate an image having color array data of the original image and also recombine the luminance data that has been reduced and resized and the second color carrier data to generate an image having color array data different from that of the original image.

9. The image processor of claim 5, wherein
the reduction resizing processor and the rearranged color array data generation processor include:
for a vertical reduction resizing process and a rearranged color array data generation process,
a filter processor configured to read data corresponding to a plurality of lines while writing color array data obtained by performing a rearranged color array data generation process and a reduction resizing process performed in the sensor-reading direction on a line-by-line basis only such that the original image is reduced and resized only in the horizontal direction on a line-by-line basis in a line memory including a plurality of lines, and to extract luminance data and color carrier data on a line-by-line basis in the vertical direction from a plurality of pieces of vertical data of interest located at an identical position in the sensor-reading direction in the read-out data corresponding to a plurality of lines;
a vertical color carrier inversion demodulation processor configured to convert the extracted vertical color carrier data into vertical color difference data;
a vertical reduction resizing processor configured to reduce the number of output lines relative to the number of input lines in the vertical luminance data and the vertical color difference data independently of each other for reduction and resizing of data;
a vertical color difference data inversion modulation processor configured to generate first color carrier data having a different sign for each line and second color carrier data having a different sign from that of the first color carrier data, from vertically continuous pieces of color difference data that have been reduced and resized in the vertical direction; and
a rearranged color array data generation processor configured to recombine the luminance data that has been reduced and resized and the first color carrier data to generate an image having color array data of the original image and also recombine the luminance data that has been reduced and resized and the second color carrier data to generate an image having color array data different from that of the original image.

10. The image processor of claim 1, wherein
in the reduction resizing processor and the rearranged color array data generation processor,
the original image is subjected to a rearranged color array data generation process and a reduction resizing process performed in a sensor-reading direction on a line-by-line basis such that the original image is reduced and resized only in one direction, and
a reduction resizing process in a direction orthogonal to the sensor-reading direction and a rearranged color array data generation process are performed on two types of color array data that have been reduced and resized only in the one direction, thereby generating a plurality of types of color array data that have been two-dimensionally reduced and resized.

11. The image processor of claim 10, wherein
in the reduction resizing processor and the rearranged color array data generation processor, two types of multicolor array data obtained by performing, on the original image, a rearranged color array data generation process and a reduction resizing process performed in the sensor-reading direction on a line-by-line basis such that the original image is reduced and resized only in a horizontal direction, are written in a memory device, and the two types of color array data are read out from the memory device on a line-by-line basis in a direction orthogonal to a line direction in writing, and are subjected to a reduction resizing process and a rearranged color array data generation process again, thereby generating a plurality of types of color array data that have been two-dimensionally reduced and resized.

12. The image processor of claim 11, wherein
in the reduction resizing processor and the rearranged color array data generation processor,
while two types of color array data obtained by performing, on the original image, the rearranged color array data generation process and the reduction resizing process performed in the sensor-reading direction on a line-by-line basis such that the original image is reduced and resized only in the horizontal direction is being written on a line-by-line basis in a line memory including a plurality of lines, data corresponding to a plurality of lines is read out, then a reduction resizing process and a rearranged color array data generation process are performed again on a plurality of pieces of vertical data of interest located at an identical position in the sensor-reading direction in the read-out data corresponding to a plurality of lines, and in the reduction resizing process in the vertical direction, the number of output lines relative to the number of input lines is reduced, thereby generating a plurality of types of color array data that have been two-dimensionally reduced and resized.

13. The image processor of claim 1, wherein
the original image is an image obtained by using a single-sensor color imaging device and has a plurality of pixels of colors arranged in a color array with a periodicity through a primary color filter.

14. A digital camera comprising the image processor of claim 1.

15. The image processor of claim 1, wherein the one or more types of display reduced-size images are displayed from two-dimensionally arranged multicolor array data.

16. An image processing method for generating a reduced-size image from a digital image signal of an original image having pixels of a plurality of colors arranged in a color array with a periodicity and for displaying the reduced-size image, the method comprising:
a reduction resizing step of reducing an original image from a single-sensor color imaging device and obtaining a reduced-size image of a size conforming to a display size of a display monitor; and
a rearranged color array data generation step of generating, based on the reduced-size image obtained in the reduction resizing step, one or more types of display reduced-size images by rearranging color information of the original image relative to a reference pixel position.

17. The image processing method of claim 16, further comprising
a rearranged color array display data generation step of generating one or more types of color array display data conforming to a color pixel array for the display monitor, based on the display reduced-size image generated in the rearranged color array data generation step.

18. The image processing method of claim 16, wherein
in the rearranged color array data generation step, the display reduced-size image is selectively input either directly to a display processor that performs a display process in accordance with display characteristics of the display monitor or to the display processor via a memory section, depending on an operation mode in shooting.

19. The image processing method of claim 16, wherein
each of a reduction resizing process in the reduction resizing step and a rearranged color array data generation process in the rearranged color array data generation step is allowed to be performed as each of a horizontal process and a vertical process on the original image.

20. The image processing method of claim 16, wherein
in the reduction resizing step and the rearranged color array data generation step,
a first reduction resizing process is performed on the original image in a sensor-reading direction on a line-by-line basis so that the original image is reduced and resized only in one direction,
a second reduction resizing process in a vertical direction orthogonal to the sensor-reading direction and a rearranged color array data generation process are performed on one type of multicolor array data that has been reduced and resized only in the one direction, thereby generating two types of multicolor array data that has been two-dimensionally reduced and resized, and
a rearranged color array data generation process is performed on the two types of the multicolor array data on a line-by-line basis again, thereby generating a plurality of types of multicolor array data.

21. The image processing method of claim 20, wherein
in the reduction resizing step and the rearranged color array data generation step,
one type of multicolor array data obtained by reducing and resizing the original image only in a horizontal direction in the first reduction resizing process is written in a memory device,
the one type of the multicolor array data is read out from the memory device on a line-by-line basis in a direction orthogonal to a line direction in write operation, and is subjected to a reduction resizing process and a rearranged color array data generation process again, thereby generating two types of two-dimensionally reduced and resized color array data, and
the two types of the multicolor array data are subjected to rearranged color array data generation process on a line-by-line basis again, thereby generating a plurality of types of multicolor array data.

22. The image processing method of claim 21, wherein
in the reduction resizing step and the rearranged color array data generation step,
while one type of multicolor array data obtained by reducing and resizing the original image only in one direction in the first reduction resizing process is being written on a line-by-line basis in a line memory including a plurality of lines, data corresponding to a plurality of lines is read out, then luminance data and color carrier data are extracted from a plurality of pieces of vertical data of interest located at an identical position in the sensor-reading direction in the read-out data corresponding to a plurality of lines and are subjected to a reduction resizing process and a rearranged color array data generation process again, and in the reduction resizing process in the vertical direction, the number of output lines relative to the number of input lines is reduced, thereby generating two types of multicolor array data that has been two-dimensionally reduced and resized, and the two types of the multicolor array data are subjected to a rearranged color array data generation process on a line-by-line basis again, thereby generating a plurality of types of color array data.

23. The image processing method of claim 20, wherein
the reduction resizing step and the rearranged color array data generation step include:
for a horizontal reduction resizing process and a rearranged color array data generation process,
a filter process of extracting luminance data and color carrier data from the original image through a process on a line-by-line basis in the sensor-reading direction;
a color carrier inversion demodulation process of converting the color carrier data into color difference data;
a reduction resizing process of reducing and resizing the luminance data and the color difference data independently of each other;
a color carrier modulation process of generating first color carrier data having a different sign for each pixel of the color difference data that has been reduced and resized in the reduction resizing process and also generating second color carrier data having a different sign from that of the first color carrier data; and
a rearranged color array data generation process of recombining the luminance data that has been reduced and resized and the first color carrier data to generate an image having color array data of the original image and also recombining the luminance data that has been reduced and resized and the second color carrier data to generate an image having color array data different from that of the original image.

24. The image processing method of claim 20, wherein
the reduction resizing step and the rearranged color array data generation step include:
for a vertical reduction resizing process and a rearranged color array data generation process,
a filter process of reading data corresponding to a plurality of lines while writing color array data obtained by performing a rearranged color array data generation process and a reduction resizing process performed in the sensor-reading direction on a line-by-line basis only such that the original image is reduced and resized only in the horizontal direction on a line-by-line basis in a line memory including a plurality of lines, and of extracting luminance data and color carrier data on a line-by-line basis in the vertical direction from a plurality of pieces of vertical data of interest located at an identical position in the sensor-reading direction in the read-out data corresponding to a plurality of lines;
a vertical color carrier inversion demodulation process of converting the extracted vertical color carrier data into vertical color difference data;
a vertical reduction resizing process of reducing the number of output lines relative to the number of input lines in the vertical luminance data and the vertical color difference data independently of each other for reduction and resizing of data;
a vertical color difference data inversion modulation process of generating first color carrier data having a different sign for each line and second color carrier data having a different sign from that of the first color carrier data, from vertically continuous pieces of color difference data that have been reduced and resized in the vertical direction; and a rearranged color array data generation process of recombining the luminance data that has been reduced and resized and the first color carrier data to generate an image having color array data of the original image and also recombining the luminance data that has been reduced and resized and the second color carrier data to generate an image having color array data different from that of the original image.

25. The image processing method of claim 16, wherein
in the reduction resizing step and the rearranged color array data generation step,
the original image is subjected to a rearranged color array data generation process and a reduction resizing process performed in a sensor-reading direction on a line-by-line basis such that the original image is reduced and resized only in one direction, and
a reduction resizing process in a direction orthogonal to the sensor-reading direction and a rearranged color array data generation process are performed on two types of color array data that have been reduced and resized only in the one direction, thereby generating a plurality of types of color array data that have been two-dimensionally reduced and resized.

26. The image processing method of claim 25, wherein
in the reduction resizing step and the rearranged color array data generation step,
two types of multicolor array data obtained by performing, on the original image, a rearranged color array data generation process and a reduction resizing process performed in the sensor-reading direction on a line-by-line basis such that the original image is reduced and resized only in a horizontal direction, are written in a memory device, and
the two types of color array data from the memory device are read out on a line-by-line basis in a direction orthogonal to a line direction in writing, and are subjected to a reduction resizing process and a rearranged color array data generation process again, thereby generating a plurality of types of color array data that have been two-dimensionally reduced and resized.

27. The image processing method of claim 26, wherein
in the reduction resizing step and the rearranged color array data generation step,
while two types of color array data obtained by performing, on the original image, the rearranged color array data generation process and the reduction resizing process performed in the sensor-reading direction on a line-by-line basis such that the original image is reduced and resized only in the horizontal direction is being written on a line-by-line basis in a line memory including a plurality of lines, data corresponding to a plurality of lines is read out, then a reduction resizing process and a rearranged color array data generation process are performed again on a plurality of pieces of vertical data of interest located at an identical position in the sensor-reading direction in the read-out data corresponding to a plurality of lines, and in the reduction resizing process in the vertical direction, the number of output lines relative to the number of input lines is reduced, thereby generating a plurality of types of color array data that have been two-dimensionally reduced and resized.

28. The image processing method of claim 16, wherein
the original image is an image obtained by using a single-sensor color imaging device and has a plurality of pixels of colors arranged in a color array with a periodicity through a primary color filter.

29. The image processing method of claim 16, wherein the one or more types of display reduced-size images are displayed from two-dimensionally arranged multicolor array data.

* * * * *